United States Patent
MacInnis et al.

(10) Patent No.: US 9,813,711 B2
(45) Date of Patent: Nov. 7, 2017

(54) HYBRID TRANSFORM-BASED COMPRESSION

(71) Applicant: Broadcom Corporation, Irvine, CA (US)

(72) Inventors: Alexander Garland MacInnis, Los Altos, CA (US); Frederick George Walls, Grafton, WI (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 266 days.

(21) Appl. No.: 14/302,940

(22) Filed: Jun. 12, 2014

(65) Prior Publication Data

US 2014/0294089 A1 Oct. 2, 2014

Related U.S. Application Data

(63) Continuation-in-part of application No. 14/180,226, filed on Feb. 13, 2014, which is a continuation-in-part of application No. 14/044,627, filed on Oct. 2, 2013.
(Continued)

(51) Int. Cl.
*H04N 7/12* (2006.01)
*H04N 11/02* (2006.01)
(Continued)

(52) U.S. Cl.
CPC ........... *H04N 19/124* (2014.11); *H04N 19/18* (2014.11); *H04N 19/61* (2014.11); *H04N 19/62* (2014.11); *H04N 19/63* (2014.11)

(58) Field of Classification Search
CPC ...... H04N 19/124; H04N 19/18; H04N 19/62; H04N 19/63; H04N 19/61
(Continued)

(56) References Cited

U.S. PATENT DOCUMENTS

| | | | |
|---|---|---|---|
| 8,139,882 B2 | 3/2012 | Huguenel et al. | |
| 8,599,214 B1 * | 12/2013 | Dall | H04N 1/64 345/589 |

(Continued)

FOREIGN PATENT DOCUMENTS

| | | |
|---|---|---|
| EP | 0495490 A2 | 7/1992 |
| EP | 0734174 | 9/1996 |

(Continued)

OTHER PUBLICATIONS

Malvar, Henrique S., et al., Lifting-based reversible color transformations for image compression, SPIE, vol. 7073, 2008, 10 pages.
(Continued)

*Primary Examiner* — Jared Walker
(74) *Attorney, Agent, or Firm* — McDermott Will & Emery LLP

(57) ABSTRACT

A system implements a hybrid coding mode. The hybrid coding mode may implement a transform to decompose an input stream into frequency components. The frequency components may include frequency bands such as those resulting from a wavelet transform. The frequency components may have associated coefficients which may be determined via the transform. The hybrid coding mode may also implement a predictor-based coding mode. A predictor-based coding mode uses a set of values as predictors for another set of values. The hybrid mode may be implemented by using predictor-based coding to code a portion of the coefficients. For example, a coefficient may be used as a predictor for another coefficient of same frequency component. In some implementations, dynamic selection between a hybrid coding mode and a point coding mode may be used.

20 Claims, 29 Drawing Sheets

Related U.S. Application Data

(60) Provisional application No. 61/764,772, filed on Feb. 14, 2013, provisional application No. 61/709,316, filed on Oct. 3, 2012, provisional application No. 61/764,807, filed on Feb. 14, 2013, provisional application No. 61/764,891, filed on Feb. 14, 2013, provisional application No. 61/770,979, filed on Feb. 28, 2013, provisional application No. 61/820,967, filed on May 8, 2013, provisional application No. 61/856,302, filed on Jul. 19, 2013, provisional application No. 61/832,547, filed on Jun. 7, 2013, provisional application No. 61/835,949, filed on Jun. 17, 2013, provisional application No. 61/810,126, filed on Apr. 9, 2013.

(51) Int. Cl.
*H04N 11/04* (2006.01)
*H04N 19/124* (2014.01)
*H04N 19/63* (2014.01)
*H04N 19/61* (2014.01)
*H04N 19/62* (2014.01)
*H04N 19/18* (2014.01)

(58) Field of Classification Search
USPC .............................. 375/240.03, 19
See application file for complete search history.

(56) References Cited

U.S. PATENT DOCUMENTS

| | | |
|---|---|---|
| 2004/0008781 A1 | 1/2004 | Porter et al. |
| 2005/0015259 A1 | 1/2005 | Thumpudi et al. |
| 2005/0069039 A1 | 3/2005 | Crinon |
| 2006/0227870 A1 | 10/2006 | Tian et al. |
| 2006/0268012 A1 | 11/2006 | MacInnis et al. |
| 2007/0009163 A1 | 1/2007 | Sasaki et al. |
| 2008/0013844 A1* | 1/2008 | Hu .................. H04N 19/63 382/240 |
| 2008/0089413 A1* | 4/2008 | Kishi .................. H04N 19/105 375/240.13 |
| 2009/0135921 A1 | 5/2009 | Lei |
| 2010/0080479 A1* | 4/2010 | Odagiri .................. H04N 19/63 382/238 |
| 2010/0150227 A1 | 6/2010 | Lee |
| 2010/0232497 A1 | 9/2010 | MacInnis et al. |
| 2011/0176742 A1* | 7/2011 | Fukuhara .............. H04N 19/63 382/248 |
| 2011/0206289 A1* | 8/2011 | Dikbas ............. H04N 19/00484 382/238 |
| 2011/0255595 A1 | 10/2011 | Zuo |
| 2011/0310967 A1 | 12/2011 | Zhang |
| 2012/0082213 A1* | 4/2012 | Sekiguchi ............ H04N 19/186 375/240.02 |
| 2013/0089145 A1* | 4/2013 | Guo .................... H04N 19/176 375/240.12 |
| 2013/0176431 A1 | 7/2013 | Ogawa et al. |

FOREIGN PATENT DOCUMENTS

| | | |
|---|---|---|
| EP | 2034741 A1 | 8/2006 |
| WO | WO2010/091503 A1 | 8/2010 |
| WO | WO2011/043793 A1 | 4/2011 |
| WO | WO 2012/029208 A1 | 3/2012 |

OTHER PUBLICATIONS

Martucci, Stephen A., Reversible Compression of HDTV Images Using Median Adaptive Prediction and Arithmetic Coding, IEEE, 1990, 4 pages.
International Search Report, App. No. PCT/US2013/063233 dated Jan. 10, 2014, 6 pages.
International Search Report, App. No. PCT/US2013/063237 dated Jan. 30, 2014, 6 pages.
International Search Report, App. No. PCT/US2013/063232 dated Jan. 30, 2014, 6 pages.
Partial European Search Report, App. No. 13004799.6 dated Apr. 7, 2014, 5 pages.

* cited by examiner

Figure 5

| w | t | s | g | c | b | d | h |
|---|---|---|---|---|---|---|---|
|   | k | r | f | a | x |   |   |

500

HYBRID TRANSFORM-BASED COMPRESSION

CROSS REFERENCE TO RELATED APPLICATIONS

This application is a continuation-in-part of and claims priority to patent application Ser. No. 14/180,226, filed 13 Feb. 2014 which claims priority to provisional application Ser. No. 61/764,772, filed 14 Feb. 2013 and provisional application Ser. No. 61/832,547, filed 7 Jun. 2013, and is a continuation-in-part of and claims priority to patent application Ser. No. 14/044,627, filed 2 Oct. 2013, which claims priority to provisional application Ser. No. 61/709,316, filed 3 Oct. 2012, provisional application Ser. No. 61/764,807 filed 14 Feb. 2013, provisional application Ser. No. 61/764,891, filed 14 Feb. 2013, provisional application No. 61/770,979, filed 28 Feb. 2013, provisional patent application Ser. No. 61/810,126, filed 9 Apr. 2013, provisional application Ser. No. 61/820,967, filed 8 May 2013, and provisional application Ser. No. 61/856,302, filed 19 Jul. 2013 each of which is entirely incorporated herein by reference. This application also claims priority to provisional application Ser. No. 61/835,949, filed 17 Jun. 2013 which is entirely incorporated herein by reference.

TECHNICAL FIELD

This disclosure relates to image processing. This disclosure also relates to compression and decompression techniques for image transmission and display.

BACKGROUND

Immense customer demand has driven rapid advances in display technologies, image analysis algorithms, and communication technologies, as well as the widespread adoption of sophisticated image display devices. As just a few examples, these devices range from DVD and Blu-ray players that drive high resolution displays for home theaters, to the now ubiquitous smart phones and tablet computers that also have very high resolution displays. Improvements in image processing techniques will continue to expand the capabilities of these devices.

BRIEF DESCRIPTION OF THE DRAWINGS

FIG. 5 shows example sample locations.

DETAILED DESCRIPTION

Figure 1:
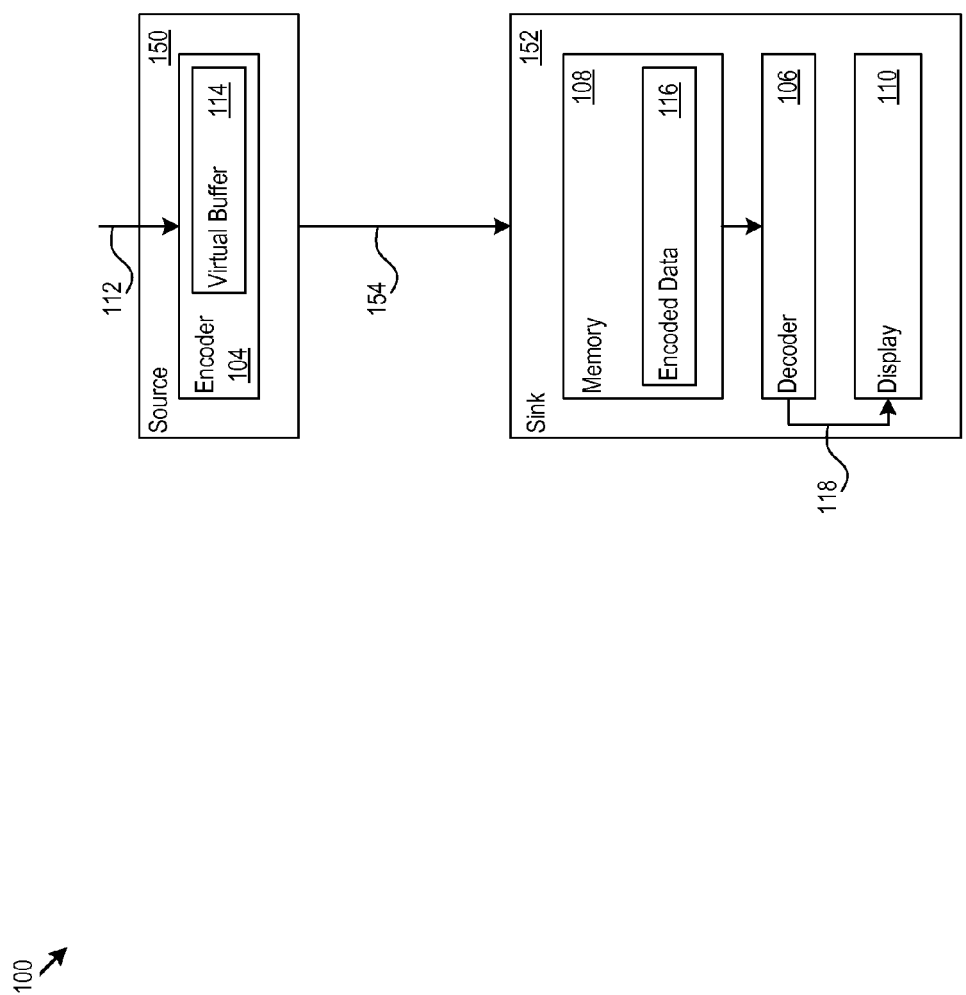
FIG. 1 shows an example architecture in which a source communicates encoded data to a sink.

FIG. 1 shows an example architecture 100 in which a source 150 communicates with a sink 152 through a communication link 154. The source 150 or sink 152 may be present in any device that manipulates image data, such as a DVD or Blu-ray player, a smartphone, a tablet computer, or any other device. The source 150 may include an encoder 104 that maintains a virtual buffer 114. The sink 152 may include a decoder 106, memory 108, and display 110. The encoder 104 receives source data 112 (e.g., source image data) and may maintain the virtual buffer 114 of predetermined capacity to model or simulate a physical buffer that temporarily stores compressed output data. The encoder 104 may also evaluate the encoded symbols for transmission at a predetermined bit rate. The encoder 104 may specify the bit rate, as just two examples, in units of bits per pixel, or in units of bits per unit of time.

The encoder 104 may determine the bit rate, for example, by maintaining a cumulative count of the number of bits that are used for encoding minus the number of bits that are output. While the encoder 104 may use a virtual buffer 114 to model the buffering of data prior to transmission of the encoded data 116 to the memory 108, the predetermined capacity of the virtual buffer and the output bit rate do not necessarily have to be equal to the actual capacity of any buffer in the encoder or the actual output bit rate. Further, the encoder 104 may adjust a quantization step for encoding responsive to the fullness or emptiness of the virtual buffer. Buffer fullness is a metric that may apply to any buffer including rate buffers (e.g., physical memory, and/or other buffers), virtual buffers, and buffer models. An exemplary encoder 104 and operation of the encoder 104 are described below.

The decoder 106 may obtain the encoded data 116 from the memory 108. Further, the decoder 106 may determine the predetermined virtual buffer capacity and bit rate, and may determine the quantization step that the encoder 104 employed for encoding the encoded data 116. As the decoder 106 decodes the encoded data 116, the decoder 106 may also determine the fullness or emptiness of the virtual buffer 114 and adjust the quantization step used for decoding. That is, the decoder 106 may track the operation of the encoder 104 and determine the quantization step that the encoder 104 used. The decoder 106 decodes the encoded data 116 and provides video data 118 to a display 110. In some implementations, the quantization step is not present in the encoded data 116, saving significant bandwidth. Examples of decoders 106 and encoders 104, and their operation are described below.

The memory 108 may be implemented as Static Random Access Memory (SRAM), Dynamic RAM (DRAM), a solid state drive (SSD), hard disk, or other type of memory. The communication link 154 may be a wireless or wired connection, or combinations of wired and wireless connections. The encoder 104, decoder 106, memory 108, and display 110 may all be present in a single device (e.g., a smartphone). Alternatively, any subset of the encoder 104, decoder 106, memory 108, and display 110 may be present in a given device. For example, a Blu-ray player may include the decoder 106 and memory 108, and the display 110 may be a separate display in communication with the Blu-ray player.

Figure 2:
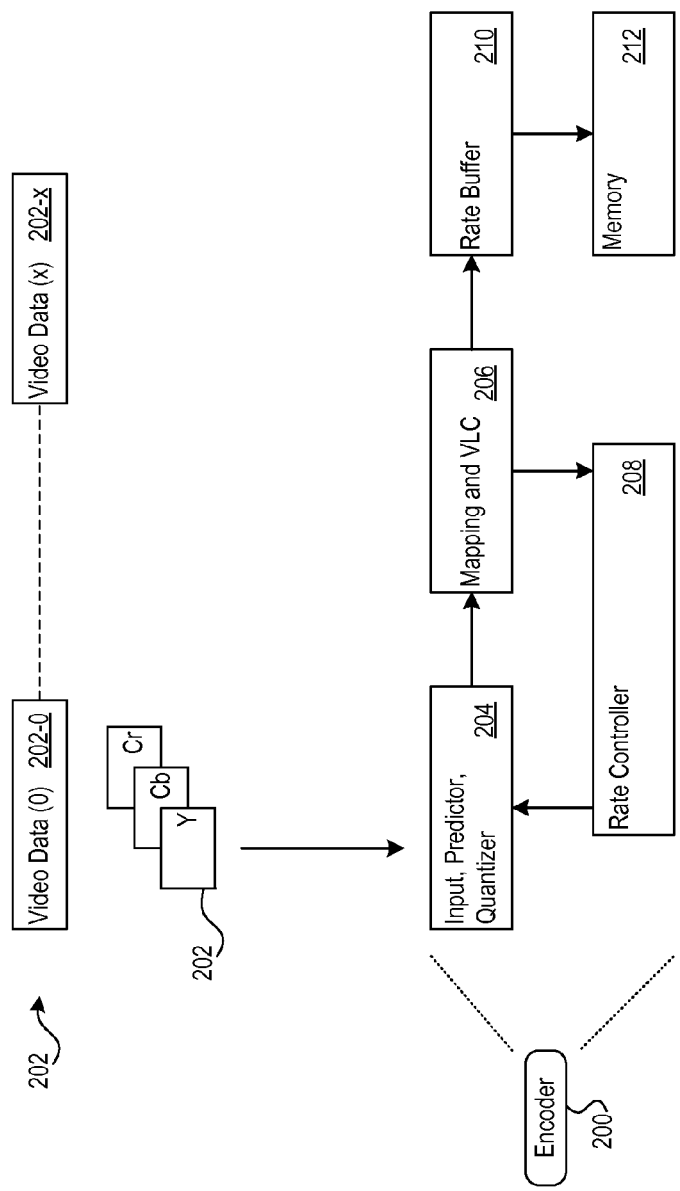
FIG. 2 is an example of an encoder.

FIG. 2 shows an example of an encoder 200. The encoder 200 encodes the video data 202. The video data 202 may take the form of a series of successive frames 202-0, . . . , 202-x, for example. The frames 202-0, . . . , 202-x may take the form of 2-dimensional matrices of pixel components, which may be represented in any color space such as the Red/Green/Blue (RGB), YUV, Luminance Y/Chroma Blue Cb/Chroma Red Cr (YCbCr), Luminance Y/Chroma Orange/Chroma Green (YCoCg), Alpha, Red, Green, Blue (ARGB), or other color space. Each of the pixel components may correspond to a spatial location. While the matrices may be overlaid to form a picture, each of the pixel components in the matrices are not necessarily co-located with pixel components in other matrices.

Each pixel component may be encoded with a value comprising a predetermined number of bits, such as eight, ten, or twelve bits per pixel component. The encoding may employ, as examples, 10 bit YCbCr 4:2:2, 8 bit YCbCr 4:2:2, 10 bit YCbCr 4:4:4, 8 bit YCbCr 4:4:4, 8 bit ARGB 32, or 8 bit RGB 24 encoding. The encoder 200 may receive the pixel components of the frames in raster scan order: left to right, top to bottom. In certain implementations, the video encoder 200 may receive the pixel components at a predetermined rate. The predetermined rate may correspond to the real-time frames per second display rate.

The video encoder 200 may include an input, predictor & quantizer 204, a mapping and variable length coder (VLC) 206, rate controller 208, a rate buffer 210, and memory (e.g., DRAM) 212. The video encoder 200 receives and encodes the pixel components. While the number of bits representing pixel components coming into the video encoder 200 may be constant (per pixel component), the number of bits representing each coded pixel may vary dramatically. The encoder 200 may increase the number of bits representing coded pixels by reducing the quantization step, or decrease the number of bits by increasing the quantization step.

The input, predictor & quantizer 204 predicts and quantizes the pixel components, resulting in quantized residuals. In certain implementations, the input, predictor & quantizer 204 may predict a pixel component from previously encoded and reconstructed pixel components in the same frame, e.g., 202-0. The mapper and variable length coder 206 codes the quantized residuals, resulting in coded bits.

The input, predictor & quantizer 204 may use a predetermined initial quantization step for quantizing a predetermined amount of data, such as video pixel data. The mapping and variable length coder 206 signals the rate controller 208, which in turn instructs the input, predictor & quantizer 204 to increment, decrement, or leave unchanged the quantization parameter, as will be described in more detail below.

The mapping and variable length coder 206 may code the quantized sample values using their natural 2's complement binary values. The number of bits that the mapping and variable length coder 206 uses to code each value may be determined dynamically by a combination of recent history of coded values of the same pixel component and a prefix value associated with each unit of samples.

The rate controller 208 determines whether to increment, decrement, or leave unchanged the quantization step. The rate controller 208 may perform the quantization step analysis, e.g., by simulating or modeling a buffer of predetermined capacity that it evaluates at a predetermined bit rate. The modeled buffer may be referred to as a virtual buffer. If the virtual buffer is becoming full, the rate controller 208 may increase or increment the quantization step. If the virtual buffer is becoming empty, the rate controller 2098 may decrease or decrement the quantization step. Further implementations are described below with respect to rate control for slices.

The rate controller 208 may determine the fullness of the virtual buffer by, e.g., counting the bits that are used to encode the input received over a given number of input samples and subtracting the product of the predetermined bit rate, in bits per sample, and the number of input samples. The number of input samples may be as few as one sample.

A decoder may decode the encoded data starting with the initial quantization step. As the decoder decodes the encoded data, the decoder may also determine the fullness of the virtual buffer. The decoder may determine the fullness or emptiness by observing the amount of bits that were used to encode an amount of decoded data corresponding to the number of input samples. The decoder may then determine the quantization step decision that was made at the encoder 200. Accordingly, the encoder 200 does not need to explicitly transmit the quantization step to the rate controller or any other logic in the decoder.

Figure 3:
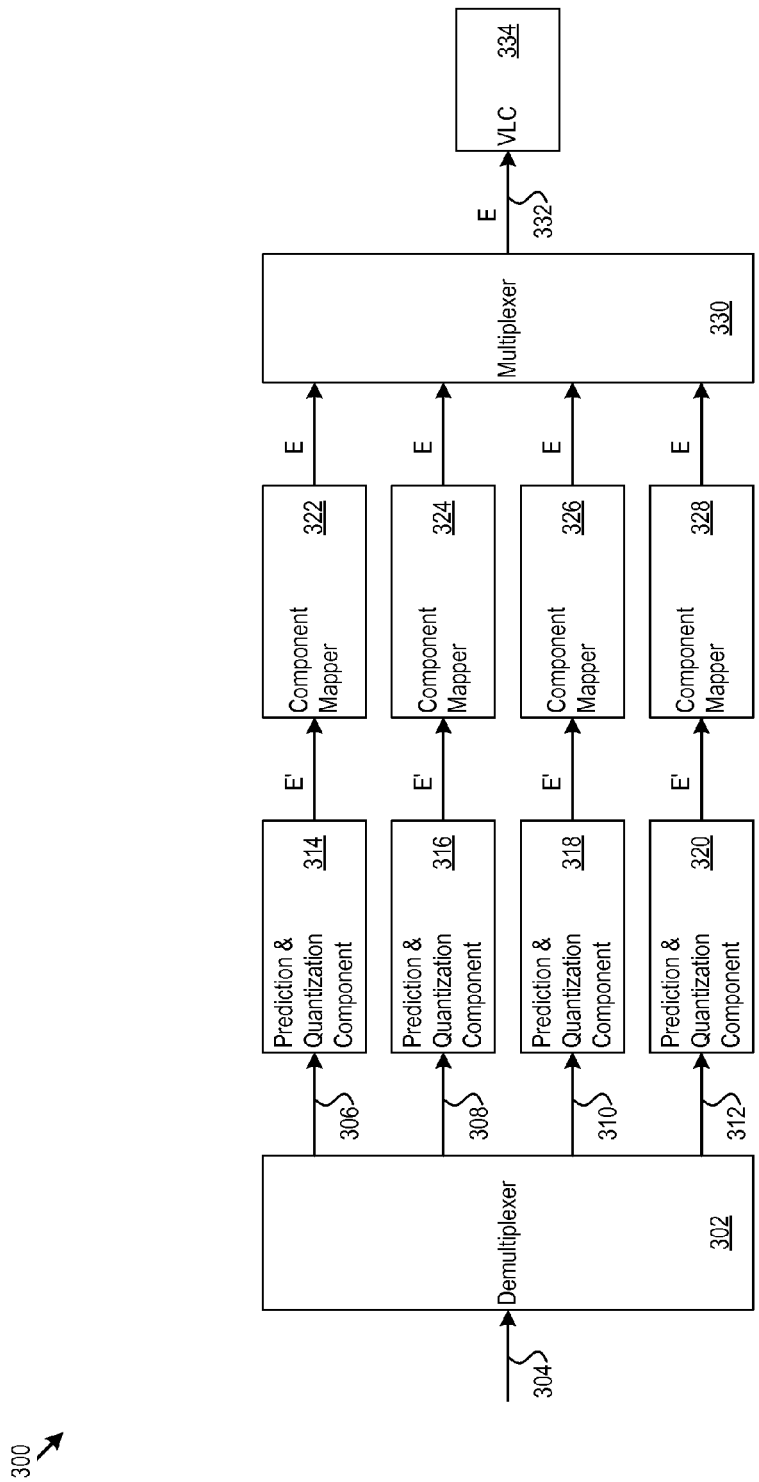
FIG. 3 shows a parallel processing architecture.

FIG. 3 shows a parallel processing architecture 300. The demultiplexer 302 receives the input pixel components 304, and separates each pixel component into constituent parts, e.g., Alpha 306, Red 308, Green 310, and Blue 312. The prediction & quantization blocks 314, 316, 318, and 320 are associated with a particular one of the constituent parts of the pixel components. There may be any number of such blocks and they may operate in parallel. In the case of a format with four pixel components, such as ARGB, each prediction & quantization block processes a particular component part. When the architecture 300 processes pixel components with fewer constituent parts than prediction & quantization blocks, then some of the prediction & quantization blocks need not operate for the processing of those pixel components. The prediction & quantization blocks 314-320 may provide quantized residuals to a particular one of component mappers 322, 324, 326, and 328. The component mappers 322-328 may also operate in parallel.

The mappers 322-328 provide mapped quantized residuals 'E' to a multiplexer 330. The multiplexer 330 multiplexes the mapped quantized residuals 'E' into a residual stream 332 that is provided to the variable length coder 334. Alternatively, there may be a variable length encoder associated with each component mapper, and the multiplexer 330 may multiplex the variable length encoded quantized residuals output by the multiple variable length encoders.

Figure 4:
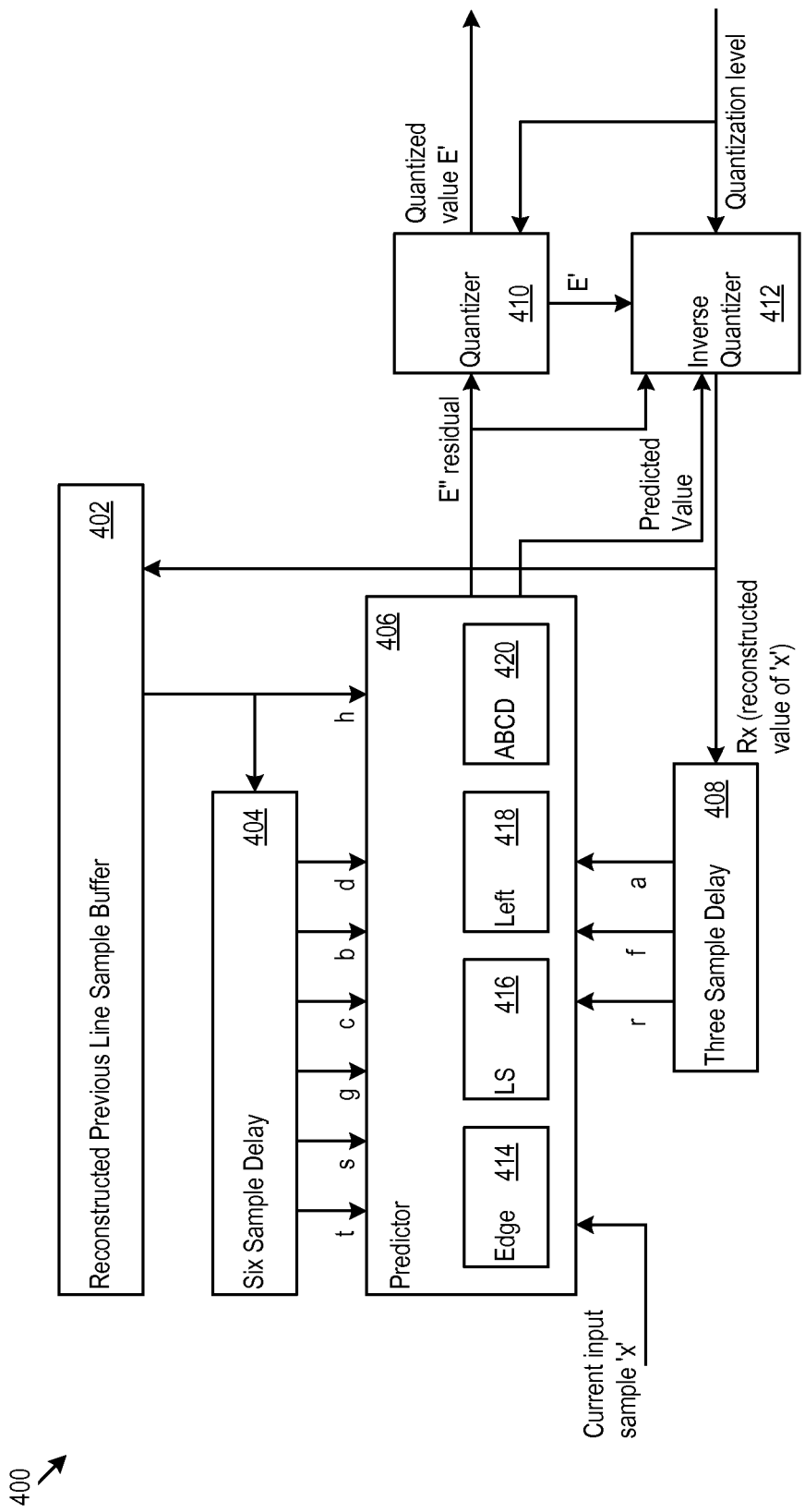
FIG. 4 shows an example of a predictor and quantizer.

FIG. 4 shows an example of a predictor and quantizer 400. The predictor and quantizer 400 includes a buffer 402, first delay logic 404 (implementing, e.g., six sample delay), a prediction engine 406, and second delay logic 408 (implementing, e.g., 3 sample delay). The buffer 402 may store the previous reconstructed image line. The prediction engine 406 receives the current pixel component 'x', reconstructed pixel components 'w', 't', 's', 'g', 'c', 'b', 'd', and 'h' from the previous line from the first delay blocks 404, and reconstructed pixels from the left on the current line, 'k', 'r', 'f', 'a' from the second delay blocks 408.

In order to use reconstructed pixel components, instead of the input pixel components, the quantizer 410 may provide quantized residuals E' to an inverse quantizer 412. The inverse quantizer 412 inverse quantizes the quantized residuals. The reconstructed pixels 'Rx' are generated from the quantized residuals E' and the predicted values from the prediction engine.

The prediction engine 406 may include an Edge prediction engine 414, LS prediction engine 416, Left prediction engine 418, and ABCD prediction engine 420. As described above, the prediction engine 406 predicts the current pixel component 'x' from reconstructed pixel components 'w', 't', 's', 'g', 'c', 'b', 'd', and 'h' from the previous line, and reconstructed pixels from the left on the current line, 'k', 'r', 'f', 'a', thereby resulting in a residual E'' representing the pixel component 'x'.

Figure 5:
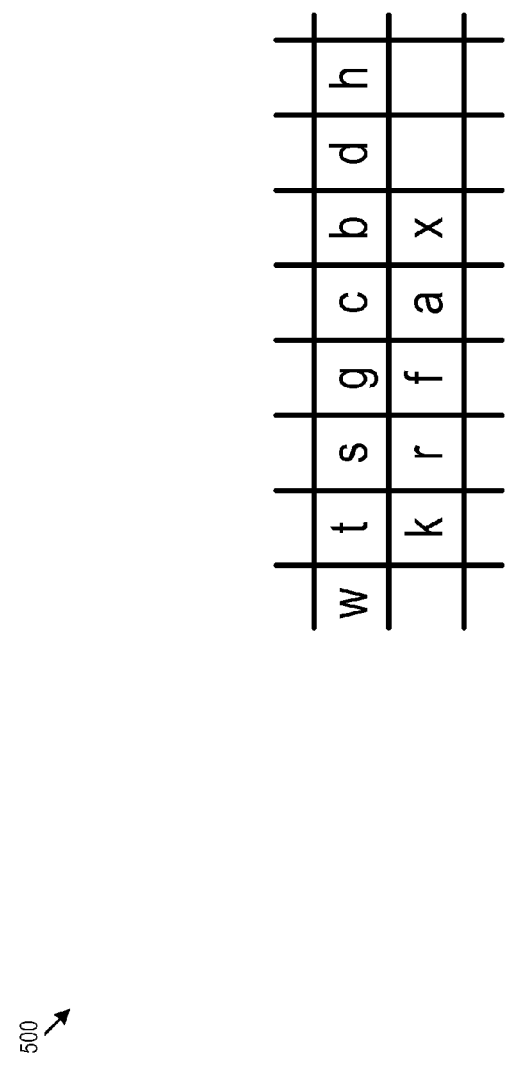

The operation of the prediction engine 406 will now be described with reference to FIG. 5, which shows example pixel components 500. The prediction engine 406 may adaptively predict pixel components from neighboring reconstructed pixels of the line above, and the left pixels of the same line of the pixel to be predicted. For example, the prediction engine 406 may predict pixel 'x' from a combination of any of the reconstructed pixels 't', 's', 'g', 'c', 'b', 'd', 'h', 'k', 'r', 'f', and 'a'.

The spatial prediction adaptively chooses an output from one of the four candidate prediction engines: the Edge prediction engine 414, LS prediction engine 416, Left prediction engine 418, and ABCD prediction engine 420 as its predictor for the current pixel component. The choice may be made according to the prediction errors determined for one or more previous reconstructed pixel components, considering the candidate predictors. This operation may be the same in both the encoder and decoder, and no prediction control information needs to be included in the encoded data. The decoder may implement an identical prediction mode algorithm and deduce the prediction mode used by the encoder. Once a predictor is selected, the value of each sample is predicted using the selected predictor. The residual value E'' is calculated as the difference between the predicted value and the actual sample value.

LS Prediction Engine 416

The LS prediction engine 416 may produce a predicted value Px of the current sample 'x' according to the following:

```
if (c >= max (a, b))
    Px = min (a, b);
else {
    if (c <= min (a, b))
        Px = max (a, b);
    else Px = a + b - c;}
```

ABCD Prediction Engine 420.

The ABCD prediction engine 420 may produce the prediction value Px=(a+b+c+d+2)/4. This is an average of four neighboring samples.

Left Prediction Engine 418

The Left prediction engine 418 may use the reconstructed value of the left pixel of the current sample as its prediction value. In other words, Px='a'.

Edge Prediction Engine 414

The Edge prediction engine 414 may employ more neighboring pixels than the LS prediction engine 416. The Edge prediction engine 414 may detect an edge at several possible angles around the current sample 'x', and use the edge information in the prediction. The Edge prediction engine 414 may search, as examples, for directions of an edge that are horizontal, vertical, 45 degree, 135 degree, about 22.5 degrees and about 157.5 degrees. The Edge prediction engine 414 may be implemented in two stages. The first stage is edge detection. The second stage is edge selection.

Some options may be specified for the prediction function. The use of the reconstructed sample value 'a', which is immediately to the left of 'x', may be disabled by configuring the Edge prediction engine 414 with a parameter such as NOLEFT=1. Avoiding the use of sample 'a' may allow more time for the prediction, quantization and inverse quantization path to function, which may be an advantage in high throughput systems where circuit timing may make it difficult to reconstruct sample 'a' quickly. The use of the reconstructed sample values 'a' and 'f', which are the two samples immediately to the left of 'x', may be disabled by configuring the Edge prediction engine 414 with a parameter such as NOLEFT=2 (also referred to as NO2LEFT). This allows even more time for the prediction, quantization and inverse quantization path to function. When circuit timing needs three clock cycles for prediction, quantization and inverse quantization, the use of NOLEFT=2 facilitates a throughput of one sample per clock.

The individual prediction engines from the four listed above may be selectively enabled and disabled. For certain classes of content, better performance may be obtained by utilizing a subset of the prediction functions. When predicting samples along the top and left edges of an image, for example, the Left prediction engine 418 may be employed, as specified below.

NOLEFT=1 Option

When NOLEFT=1, the reconstructed sample value 'a' in the LS prediction engine 416, left prediction engine 418, and ABCD prediction engine 420 is replaced by its prediction Pa using the reconstructed samples 'f', 'g', and 'c' according to the following:

```
if (ABS (g-c) > ABS (g-f) *3)
    Pa = c;
else {
    if (ABS(g-f) > ABS (g-c) *3)
        Pa = f;
    else Pa = (f+c+1) /2;}
```

NOLEFT=2 Option

When NOLEFT=2, the reconstructed sample values 'f' and 'a' in the LS prediction engine 416, left prediction engine 418, and ABCD prediction engine 420 are replaced by their predictions Pf and Pa using the reconstructed samples 'r', 's', 'g', and 'c'. The prediction of 'a' may use the same approach as in NOLEFT, except that 'f' is replaced by Pf according to the following:

$$Pf=(r+g+s+c+2)/4;$$

Edge prediction engine with NOLEFT=0, NOLEFT=1, NOLEFT=2

When NOLEFT=0, the left sample is used in the prediction, and the following may be applied to the edge detection:

```
if ( (2*ABS(a-c) > 6*ABS(c-b)) && 2*ABS(a-c) > 6*ABS(c-g) &&
2*ABS(a-c) > 6*ABS(a-f) )
    {
      edge1 = 0;
      strength1 = ABS(c-b);
    }
else if ( 2*ABS(b-c) > 6*ABS(c-a) && 2*ABS(c-d) > 6*ABS(c-a) )
    {
      edge1 = 1;
      strength1 = ABS(c-a) ;
    }
else
    {
      strength1 = max_strength;
      edge1 = 7;
    }
if ( 2* ABS(a-g) > 6*ABS(a-b) && 2* ABS(a-g) > 6*ABS(f-c) )
    {
      edge2 = 2;
      strength2 = ABS(a-b);
    }
else if( 2* ABS(a-b) > 6*ABS(a-g) && 2* ABS(a-b) > 6*ABS(s-f))
    {
      edge2 = 3;
      strength2 = ABS(a-g) ;
    }
else
    {
      strength2 = max_strength;
      edge2 = 7;
    }
if ( 2*ABS(a-g) > 6*ABS(a-d) )
    {
      edge3 = 4;
      strength3 = ABS(a-d) ;
    }
    else if ( 2*ABS(a-b) > 6*ABS(a-s) )
    {
      edge3 = 5;
      strength3 = ABS(a- s) ;
    }
    else
    {
      strength3 = max_strength;
      edge3 = 7;
    }
```

When NOLEFT=1, the left sample is not used in the prediction, and the following may be applied to the edge detection:

```
if ( (2*ABS(f-g) > 6*ABS(c-g)) && 2*ABS(f-g) > 6*ABS(s-g) &&
2*ABS(f-g) > 6*ABS(r-f) )
    {
      edge1 = 0;
      strength1 = ABS(c-g);
    }
else if ( 2*ABS(g-c) > 6*ABS(f-g) && 2*ABS(b-g) > 6*ABS(g-f) )
    {
      edge1 = 1;
      strength1 = ABS(f-g);
    }
else
    {
      strength1 = max_strength;
      edge1 = 7;
    }
if ( 2* ABS(f-s) > 6*ABS(f-c) && 2*ABS(f-s) > 6*ABS(r-g) )
    {
      edge2 = 2;
      strength2 = ABS(f-c);
    }
else if ( 2* ABS(f-c) > 6*ABS(s-f) && 2*ABS(f-c) > 6*ABS(r-t) )
    {
      edge2 = 3;
      strength2 = ABS(s-f);
    }
```

-continued

```
else
    {
      strength2 = max_strength;
      edge2 = 7;
    }
if ( 2*ABS(s-f ) > 6*ABS(f-b) )
    {
      edge3 = 4;
      strength3 = ABS(f-b);
    }
else if ( 2*ABS(f-c) > 6*ABS(f-t) )
    {
      edge3 = 5;
      strength3 = ABS(f-t);
    }
else
    {
      strength3 = max_strength;
      edge3 = 7;
    }
```

When NOLEFT=2, the two left samples are not used in the prediction, and the following may be applied to the edge detection:

```
if ( (2*ABS(r-s) > 6*ABS(g-s)) && 2*ABS(r-s) > 6*ABS(t-s) &&
2*ABS(r-s) > 6*ABS(k-r) )
    {
      edge1 = 0;
      strength1 = ABS(g-s);
    }
else if ( 2*ABS(s-g) > 6*ABS(r-s) && 2*ABS(c-s) > 6*ABS(s-r) )
    {
      edge1 = 1;
      strength1 = ABS(r-s);
    }
else
    {
      strength1 = max_strength;
      edge1 = 7;
    }
if ( 2* ABS(r-t) > 6*ABS(r-g) && 2* ABS(r-t) > 6*ABS(k-s) )
    {
      edge2 = 2;
      strength2 = ABS(r-g);
    }
else if ( 2* ABS(r-g) > 6*ABS(t-r) && 2* ABS(r-g) > 6*ABS(k-w) )
    {
      edge2 = 3;
      strength2 = ABS(t-r);
    }
else
    {
      strength2 = max_strength;
      edge2 = 7;
    }
if ( 2*ABS(t-r) > 6*ABS(r-c) )
    {
      edge3 = 4;
      strength3 = ABS(r-c);
    }
else if ( 2*ABS(r-g) > 6*ABS(r-w) )
    {
      edge3 = 5;
      strength3 = ABS(r-w);
    }
else
    {
      strength3 = max_strength;
      edge3 = 7;
    }
```

The parameter 'max_strength' may be defined as the largest possible absolute difference between two samples. This parameter may be related to the pixel data format, e.g., for 8-bit data, max_strength=255, for 10-bit data, max_strength=1023. The same edge selection logic may be applied in each case of NOLEFT=0, NOLEFT=1 and NOLEFT=2, except that the sample value 'a' may be replaced by its prediction Pa when NOLEFT=1 or NOLEFT=2, and the sample value 'f' may be replaced by its prediction Pf when NOLEFT=2:

```
if (strength1 <= strength2)
{
  if (strength1 <= strength3)
  {
    edge = edge1;
    strength = strength1;
  }
  else
  {
    edge = edge3;
    strength = strength3;
  }
}
else
{
  if (strength2 <= strength3)
  {
    edge = edge2;
    strength = strength2;
  }
  else
  {
    edge = edge3;
    strength = strength3;
  }
}
if (strength == max_strength || edge == 7)
  Px = (a+c+b+d+2) / 4;
else
{
  switch(edge)
  {
    case 0: Px = a;
    case 1: Px = b;
    case 2: Px = d;
    case 3: Px = c;
    case 4: Px = h;
    case 5: Px = g;
  }
}
```

Predictor Selection

A Unit may be considered to be a logical grouping of adjacent samples of the same component. For example, the Unit size may be selected to be equal to two. A Unit size may be the number of samples comprised by a Unit. In alternative implementations, the Unit size may be selected to have a value of one, three, four or another value. In one embodiment, when the Unit size is selected to be equal to two, for every pair of samples of one component, a selected set (up to all) of the candidate predictors may be evaluated using the previous pair of samples of the same component, and the predictor that performs best for that previous pair is selected for the current pair. The selection of a predictor may be made on boundaries that do not align with Units. There may be certain exceptions under which the set of candidate predictors is restricted, for example when samples to the left or above are not available, or for example when one or more predictors are not enabled.

For the first pair of samples of the image, e.g., the two samples on the left edge of the top line, the left prediction engine 418 may be selected as the predictor. Further, for the first pair of samples of each line other than the first, the LS prediction engine 416 may be selected. Sample values that are not available for use in prediction may be assigned a pre-determined value, for example one half of the maximum range of sample values.

For other pairs of samples, the predictor may be selected according to the estimated prediction errors of the left pair of samples, which may be calculated by all four predictors. When the reconstructed value of the current sample 'x' is found, the estimated prediction error for the current sample can be calculated as follows:

$$\text{err\_sample} = \text{ABS}(x' - Px)$$

In the above equation, Px is the predicted value of the current sample from each of the four predictors. The prediction error of one predictor is the sum of err_sample over both samples in a pair of samples for a predictor. The predictor with the smallest prediction error is then selected as the predictor for the next pair of samples of the same component.

Note when NOLEFT=1, the prediction error of the left sample is not available. Assuming the current sample is 'x' in FIG. 5, then if NOLEFT=0, the prediction engine selected by the left pair, the samples of 'f' and 'a', is used for the current sample pair. If NOLEFT=1, the predictor selected by the smallest prediction error of the available left pair may be used, e.g., the samples of 'r' and 'f' if 'x' is the second sample of the pair, or samples of 'r' and 'k' is 'x' is the first sample of the pair. If NOLEFT=2, the predictor selected by the smallest prediction error of the samples of 'r' and 'k' may be used if 'x' is the first sample of the pair, or samples of 'k' and its immediately left one if 'x' is the second sample of the pair. The residual or error value E" may be determined as: E"=x−Px.

The reconstructed sample value of 'x', for use in future predictions, may be obtained as follows:

```
x' = Px + E' * QuantDivisor;
if (x' < 0) x' = 0;
else if (x' > MAXVAL) x' = MAXVAL;
```

The value QuantDivisor is defined below. MAXVAL is the maximum value that can be coded by the uncompressed video sample word size, e.g., 1023 for 10 bit video, and 255 for 8 bit video. In one implementation, Cb and Cr are non-negative integers.

Figure 6:
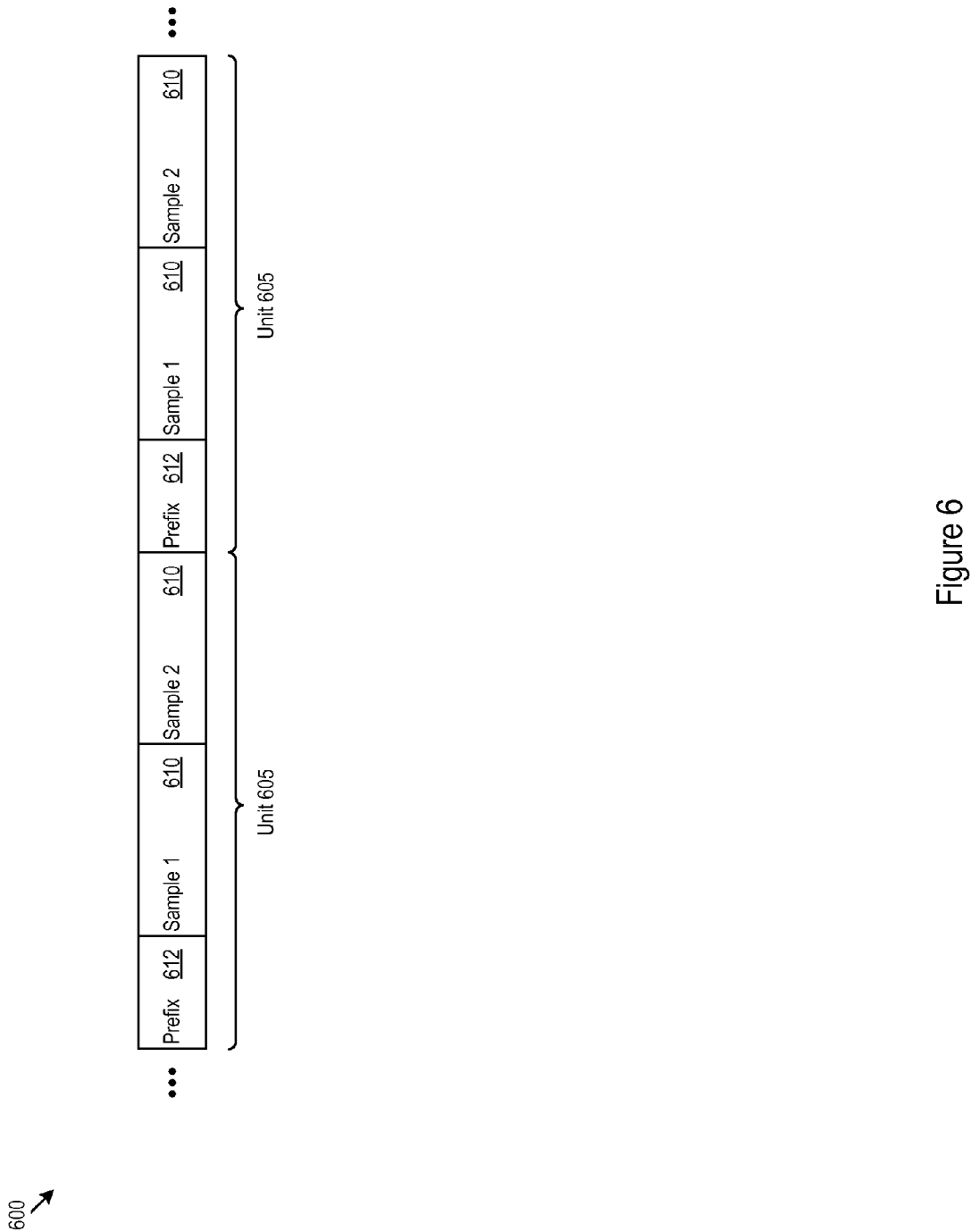
FIG. 6 shows examples of a coded format for compressed samples.

The operation of the mapper and variable length coder 206 is described with reference to FIG. 6, which shows examples of sample units 600, which are also referred to as Units. The mapper and variable length coder 206 may use entropy coding to code sample values using their natural 2's complement binary values. The number of bits used to code each value may be determined dynamically by a combination of the recent history of coded values of the same component and a prefix value associated with each Unit 605 of samples. In certain implementations, a Unit 605 comprises two samples 610 of a particular component type, e.g., Y, Cb or Cr, or Alpha, R, G or B. In some implementations, the Cb and Cr samples are coded together in one Unit. The same set of components may be used for the prediction of the number of bits.

Each Unit 605 of samples has a Unit sample size. A Unit sample size may be the size in bits of each of the samples in a Unit. The Unit 605 sample size may be large enough to code each of the samples contained in the Unit 505, and it may be larger. The size of one sample may be the number of bits used to code the sample's value in 2's complement. For example, a value of 0 has a size of 0, a value of −1 has a size of 1, a value of −2 or 1 has a size of 2, a value of −4, −3, 2 or 3 has a size of 3, and so on.

A Unit 605, may have a maximum sample size, which is the maximum of the sizes of all the samples in the Unit 605. A Unit 605 may also have a predicted size. In one implementation, if the predicted size is greater than or equal to the maximum sample size, then the Unit 605 sample size is equal to the predicted size. In one implementation, if the maximum sample size is greater than the predicted size, then the difference, which is always non-negative, is coded in the prefix value 612, and the maximum sample size may be used as the Unit 605 sample size. In another implementation, if the maximum sample size is different from the predicted size, then the difference, which may be positive or negative, is coded in the prefix value 612. The prefix value may use unary coding, e.g., for implementations with non-negative prefix values, the value 0 has the code 1 (binary), the value 1 has the code 01, the value 2 has the code 001, and so on. The Unit sample size is the sum of the predicted size and the prefix value 612. For 10 bit video, the greatest possible sample size is 10, and the smallest possible predicted size is 0, so the greatest possible prefix value is 10, which occupies 11 bits i.e. 0000 0000 001. For implementations with signed prefix values, signed prefix values may be unary coded.

The predicted size may be a function of the sizes of previously coded samples. In one implementation, the predicted size is the average, with rounding, of the sizes of the samples of the same component of the previous two samples, e.g., of the previous Unit, given that the Unit size is 2. If the Unit size is 4, the predicted size may be the average of the sizes of the four samples of the same component of the previous Unit. If the Unit size is 3, the predicted size may be generated by the average of the sizes of the last two samples of the same component of the previous Unit, thereby avoiding division by 3. Alternatively, if the Unit size is 3, the predicted size may be generated as a weighted sum of 3 samples of the previous unit of the same component. The weights may be, for example, (¼, ¼, ½).

For example, if a component of an image, after quantization, is such that the size of the samples is 2 for many consecutive samples, then the predicted size is 2, and the prefix value is 0. Therefore the prefix code is '1', and each sample is coded using 2 bits, and a Unit of two samples has a total of 5 bits. In the event of a transient causing a sudden increase in the sample size, the prefix value codes the increase in the sizes. In the event of another transient causing a sudden decrease in the sample size, the prefix value may be 0 and the Unit sample size may be equal to the predicted size, which may be in excess of the sizes of the samples in the Unit. Therefore each sample may be coded with a number of bits equal to the predicted size, even though their own sizes are less. Following a transient, in the absence of another change in sample sizes, the Unit sample size and predicted size converge again. This technique results in very efficient coding of samples, given that the sizes of the samples may change from Unit to Unit, particularly when the sizes do not frequently change very rapidly.

The delta size Unit variable length coding (DSU-VLC) scheme facilitates efficient encoding and decoding at high speed in hardware, in part because it does not rely upon VLC tables. The number of bits in a Unit to be decoded is determined from the prefix value (counting zeroes) and the predicted size, which can be determined before encoding or decoding the current Unit. It is feasible to encode or decode one Unit per clock, and faster decoding approaches are also feasible. Encoding can encode multiple Units in parallel, for greater throughput. The Unit size may be selected to be greater than two for various reasons. For example, larger Unit size may be chosen where the usage imposes a through- put requirement that cannot practically be met with a Unit size of 2, in which case a Unit size of 3 or 4 may be used.

Referring again to FIG. 4, the quantizer 410 quantizes the residuals E", which in general includes the case of lossless coding, using a quantization parameter Quant. Quant may take on values ranging from 0, signifying lossless, to the value that corresponds to the highest value of QuantDivisor[ ] (see below). With an exemplary set of values of QuantDivisor and QuantOffset shown below, the value of Quant ranges from 0 to 17.

The quantizer 410 may perform quantization on the residual value E" as follows:

```
if (Quant = 0)
    E' = E";
else
    if (E" >= 0)
        E' = (E" + QuantOffset[Quant]) / QuantDivisor[Quant];
    else E' = (E" − QuantOffset[Quant]) / QuantDivisor[Quant];
``` where division may be with truncation, as, e.g., in the 'C' language.

The set of divisors may be:
int QuantDivisor[ ]={1, 3, 5, 7, 9, 10, 12, 14, 16, 18, 20, 24, 28, 32, 48, 64, 128, 256};

The associated set of offsets, the rounding constants, may be:
int QuantOffset[ ]={0, 1, 2, 3, 4, 4, 5, 6, 7, 8, 9, 11, 13, 15, 23, 31, 63, 127};

In this approach, there are 4 odd-valued divisors (3, 5, 7 and 9), and seven that are products of one of these odd-valued divisors and one of five other values, each of which is a power of 2: 2**N. As a result, in one implementation, the quantization function supports 4 odd-valued divisors.

The use of this particular set of values of QuantDivisor[ ] provides good compression with low complexity. Note that division by the odd numbers can be performed in hardware using multiplication by one of a small set of optimized constant values.

In other implementations, the divisors may be selected such that they do not have odd factors. For example:
int QuantDivisor[ ]={1, 2, 4, 8, 16, 32, 64, 128, 256, 512, 1024, 2048, 4096};
int QuantOffset[ ]={0, 0, 1, 3, 7, 15, 31, 63, 127, 255, 511, 1023, 2047};

Rate Control

The value of Quant is determined via a rate control technique, which may be performed identically in both the encoder and decoder. The rate control technique may base its decisions on a measure of the activity of the most recently coded predetermined number of pixel components and on the fullness of the buffer model. The predetermined number may be, for example, 3, 2, or some other number. The value of Quant may be updated once per coded predetermined number of pixel components.

Figure 7:
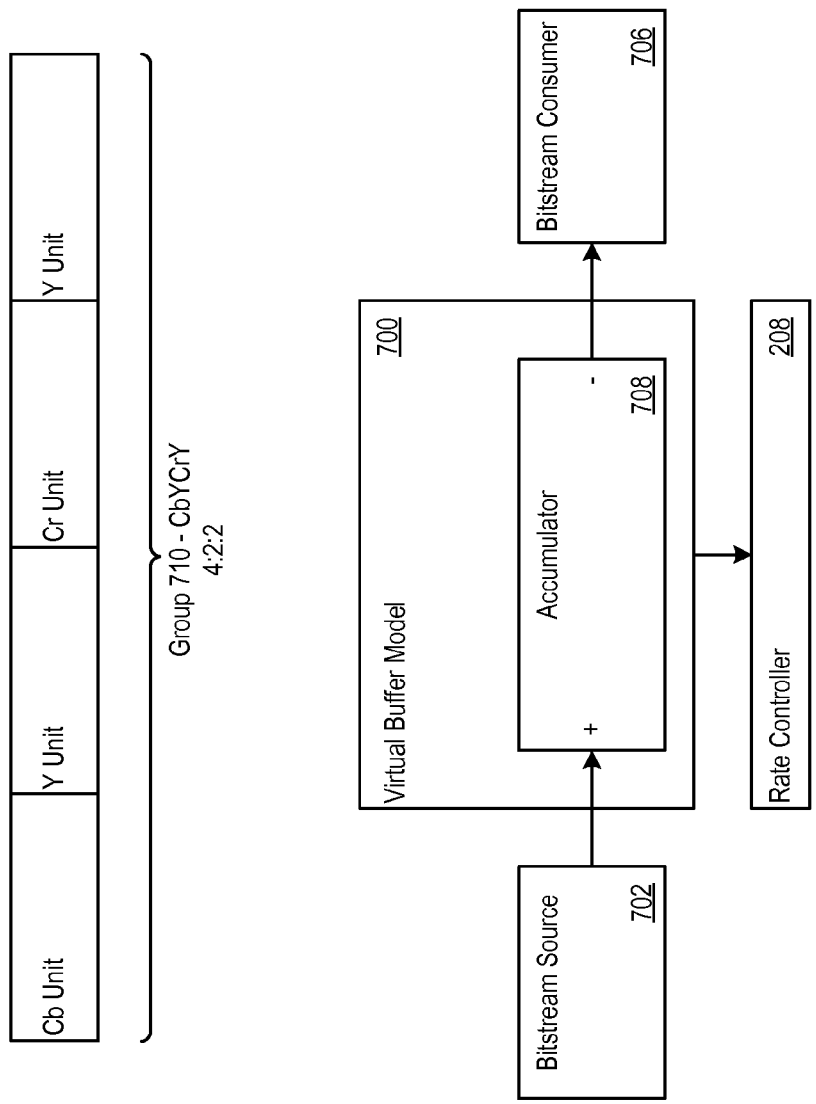
FIG. 7 shows an example of a virtual buffer model.

FIG. 7 shows an example of a virtual buffer model 700. The virtual buffer model 700 is in communication with a bitstream source 702, the rate controller 208, and a bitstream consumer 706. The virtual buffer model 700 models the behavior of a rate buffer where the output bit rate is a specified bit rate. The specified bit rate may be in units of bits per pixel or per group of pixels, or it may be in other units such as bits per unit of time, such as bits per second. The bitstream consumer 706 may model the consumption of bits at a specified rate. The bitstream source 702 may be the output of the mapper and variable length coder 206, for example. A group of pixels may comprise a predetermined number of pixels, for example two, three, four, or some other number.

Bits enter the virtual buffer model 700 when they are created. For example, the number of bits used to code a Group is added to the model 700 when the Group is coded. Bits leave the virtual buffer model 700 according to a pre-determined schedule. For example, the schedule may specify a constant rate in units of bits per group. The virtual buffer model 700 may be implemented as an accumulator 708, in which one value is added and other value is subtracted per Group. Alternatively, the schedule of removing bits from the virtual buffer model 700 may be in units of bits per second. Alternatively, the times at which bits are added to or subtracted from the buffer model 700 may be finer or coarser than a Group, and may use a construct other than a Group, such as a sample, a macroblock, a slice or a picture. In order to model the behavior of a First In First Out (FIFO) buffer, the fullness of the virtual buffer model 700 may be clamped to 0 when subtracting a number of bits from the fullness that would otherwise result in a negative value of fullness.

When the output bit rate used in the virtual buffer model 700 is less than or equal to the actual bit rate at which bits are removed from the rate buffer in an encoder, and the rate controller 704 ensures that the virtual buffer model 700 does not overflow, the rate buffer also does not overflow. More generally, the encoder may use the virtual buffer model 700 to manage the rate of creation of bits by the encoder such that another virtual buffer model, which may be applied later to the encoder's bit stream, does not overflow or underflow. The bit rate at which bits leave the virtual buffer model can be changed at any time to any supported value. If the actual rate at which bits leave the rate buffer equals or approximates the rate at which bits leave the virtual buffer model, the encoder's bit rate can be set to any supported bit rate with effectively instantaneous response. Because the rate control uses the virtual buffer model to manage the rate of creation of bits, the rate control function does not need to monitor the rate at which bits leave the rate buffer.

In one implementation, the encoder and decoder perform identical rate control (RC) decisions, which control the value of the quantizer, or Quant, without the encoder transmitting any bits that specifically indicate quantization control. The rate control may depend on the activity, measured by the sizes of the samples, of the previous Group, as well as fullness of the virtual buffer model, and a measure of the strength of an edge, if any, in the preceding samples. The rate control may use several configurable thresholds. Units 605 are organized into Groups 710. Groups 710 are utilized to organize the samples to facilitate the buffer model and rate control. In another exemplary implementation, the decoder does not perform the same rate control decisions as the encoder, and the encoder transmits bits which indicate at least a portion of the quantization control.

In one implementation, the encoder, including the rate controller 208, ensures that the virtual buffer model 700 never exceeds a defined maximum fullness, while choosing quantization levels to maximize overall subjective image quality. For some images and bit rates, both may be achieved relatively easily, while for others, the buffer fullness may vary and approach or reach the size of the virtual buffer model 700 at times and the quantization may vary and may reach the maximum allowed value at times.

The virtual buffer model 700 may represent a FIFO of predetermined size, BufferSize. The value of BufferSize may be chosen according to the particular application. A larger size generally facilitates better compression for a given bit rate and image contents, and vice versa. A larger size also implies a larger amount of space available in a physical rate buffer, as well as potentially increased latency. In an exemplary implementation, at the start of a picture, the buffer model 700 is initialized to be empty. Alternatively, the virtual buffer model 700 fullness may be retained from one picture to the next, or it may be initialized to some other value.

As each Group 710 of samples is encoded, the number of bits used to code the Group is added to the accumulator in the virtual buffer model 700. After each Group is coded, a number equal to the budget of bits per Group, e.g., the specified bit rate, is subtracted from the accumulator, with the result clamped to 0 to enforce non-negative fullness. In implementations where the decoder mimics the rate control of the encoder, the same operation happens in the decoder: as each Group is decoded, the number of bits that the Group occupies is added to the model and the specified bit rate, e.g., the budget number of bits per Group, is subtracted, with the result clamped to 0. This way the encoder and decoder buffer models track exactly for every Group in each picture. The rate controller 208 can guarantee that the buffer fullness never exceeds the defined maximum value, e.g., the buffer size, by adjusting the value of Quant.

In one implementation, at the start of each picture, the quantization value Quant is initialized to 0, corresponding to lossless coding. In another implementation, the value of Quant is initialized to a non-zero value. The value of Quant may be adjusted dynamically to avoid overflowing the buffer model while maximizing the compressed image quality. The rate control algorithm may facilitate encoding of difficult images at low bit rates with minimum visible quantization errors, as well as encoding difficult images at higher bit rates with no visible quantization error.

In one implementation, the activity level of each Group is measured. The activity level may be the maximum quantized residual size of each Unit in the Group, times the number of samples in a Unit (e.g., either 2, 3, or 4), plus 1 (corresponding to a prefix value of 0), summed over all of the Units in the Group. The quantized residual sizes are after quantization using the current value of Quant. As an example of 2 samples per unit and 3 units per group, the numbers of bits for sample 0 and 1 are SampleSize[0] and SampleSize[1] respectively. Assume the maximum of the two samples for unit 0 is MaxSizeUnit[0]=MAX(SampleSize[0], SampleSize[1]), then the activity level for the group is RcSizeGroup=MaxSizeUnit[0]+1+MaxSizeUnit[1]+1+MaxSizeUnit[2]+1. Another parameter that calculates the real number of bits coded in the last Group, e.g., BitsCodedCur, in example shown below, is also used in determining whether the value of Quant should be increased, decreased, or left unchanged.

The following describes control of the quantization parameter, Quant, for an example where the virtual buffer size is 16 Kbits. In this example, "MaxBitsPerGroup" represents the pre-determined data rate in bits per group. Offset[ ] is a set of values that adjust the "target_activity_level" according to the fullness of the buffer model, which is represented by "Buffer_fullness", and which is compared to various threshold values represented by BufTh1, BufTh2, and so on:

```
// Set target number of bits per Group according to buffer fullness
if(Buffer_fullness < BufTh1)
{
    Target_activity_level = MaxBitsPerGroup + offset[0];
    MIN_QP = minQP[0];
    MAX_QP = maxQP[0];
}
else if(Buffer_fullness < BufTh2)
{
    Target_activity_level = MaxBitsPerGroup + offset[1];
    MIN_QP = minQP[1];
    MAX_QP = maxQP[1];
}
else if(Buffer_fullness < BufTh3)
{
    Target_activity_level = max(0, (MaxBitsPerGroup + offset[2]));
    MIN_QP = minQP[2];
    MAX_QP = maxQP[2];
}
else if(Buffer_fullness < BufTh4)
{
    Target_activity_level = max(0, (MaxBitsPerGroup + offset[3]));
    MIN_QP = minQP[3];
    MAX_QP = maxQP[3];
}
else if(Buffer_fullness < BufTh5)
{
    Target_activity_level = max(0, (MaxBitsPerGroup + offset[4]));
    MIN_QP = minQP[4];
    MAX_QP = maxQP[4];
}
else if(Buffer_fullness < BufTh6)
{
    Target_activity_level = max(0, (MaxBitsPerGroup + offset[5]));
    MIN_QP = minQP[5];
    MAX_QP = maxQP[5];
}
else if(Buffer_fullness < BufTh7)
{
    Target_activity_level = max(0, (MaxBitsPerGroup + offset[6]));
    MIN_QP = minQP[6];
    MAX_QP = maxQP[6];
}
else if(Buffer_fullness < BufTh8)
{
    Target_activity_level = max(0, (MaxBitsPerGroup + offset[7]));
    MIN_QP = minQP[7];
    MAX_QP = maxQP[7];
}
else if(Buffer_fullness < BufTh9)
{
    Target_activity_level = max(0, (MaxBitsPerGroup + offset[8]));
    MIN_QP = minQP[8];
    MAX_QP = maxQP[8];
}
else if(Buffer_fullness <BufTh10)
{
    Target_activity_level = max(0, (MaxBitsPerGroup + offset[9]));
    MIN_QP = minQP[9];
    MAX_QP = maxQP[9];
}
else if(Buffer_fullness < BufTh11)
{
    Target_activity_level = max(0, (MaxBitsPerGroup + offset[10]));
    MIN_QP = minQP[10];
    MAX_QP = maxQP[10];
}
else if(Buffer_fullness < BufTh12)
{
    Target_activity_level = max(0, (MaxBitsPerGroup + offset[11]));
    MIN_QP = minQP[11];
    MAX_QP = maxQP[12];
}
else if(Buffer_fullness < BufTh13)
{
    Target_activity_level = max(0, (MaxBitsPerGroup + offset[12]));
    MIN_QP = minQP[12];
    MAX_QP = maxQP[12];
}
else if(Buffer_fullness < BufTh14)
{
    Target_activity_level = max(0, (MaxBitsPerGroup + offset[13]));
    MIN QP = minQP[13];
    MAX QP = maxQP[13];
}
else
{
    Target_activity_level = max(0, (MaxBitsPerGroup + offset[14]));
    MIN_QP = minQP[14];
    MAX_QP = maxQP[14];
}
```

The 14 values of threshold (BufTh1 through 14) of buffer fullness in units of bits may be set for a virtual buffer model size of 16 Kbits (16,384 bits) as {1792, 3584, 5376, 7168, 8960, 10752, 12544, 13440, 14336, 15232, 15456, 15680, 15960, 16240}. The 15 values of offsets (offset[0 to 14]) for Target_activity_level may be set as {20, 10, 0, −2, −4, −4, −8, −10, −10, −10, −10, −12, −12, −12, −12}.

At any range of buffer fullness, which is bounded by two consecutive thresholds, e.g., BufTh1<=Buffer_fullness<BufTh2, there is a range of Quant, specified by MIN_QP and MAX_QP, allowed for the rate controller 208 to use. This helps to regulate the variation of Quant to avoid over-quantization when the buffer level is low, as well as avoiding the use of too many less significant bits that may not help with visual quality when the buffer fullness is high. The pair of parameters, MIN_QP and MAX_QP, associated with each range of buffer fullness levels are selected respectively from an array of 15 values of minQP[0 to 14], with example default values of {0, 0, 1, 2, 2, 3, 4, 8, 8, 8, 13, 14, 15, 16, 17}, and an array of 15 values of maxQP[0 to 14] with example default values of {2, 2, 2, 3, 3, 7, 9, 10, 11, 12, 13, 14, 15, 16, 17}, according to the buffer fullness level.

The value of Quant is adjusted according to the measured activity levels, the target activity level, the allowed Quant range specified by MIN_QP and MAX_QP, and the strength of a strong edge. When there is a strong edge, the activity level normally increases significantly if the value of Quant stays fixed. The rate control algorithm detects the presence of a strong edge by examining the activity level of the current Group and that of the preceding Group as well as the associated values of Quant. When a strong edge is detected, the rate control algorithm does not increase the value of Quant immediately after the presence of the strong edge, in order to avoid potential quantization noise that is more readily visible in smooth areas that may follow a strong edge. This factor may be observed for example in some cartoon content. The rate control may increase the value of Quant at the second group after a strong edge. One parameter that serves as a threshold in detecting strong edges is defined as EdgeFactor in the pseudo code below.

Some implementations avoid excessive fluctuation of Quant around a high quantization value, which could result in visible high frequency quantization noise in some images. These implementations regulate the increase of Quant so that Quant does not increase for two consecutive Groups of pixels when the value of Quant is already high, with certain exceptions. However, the decrease of Quant may be allowed as soon as the measured activity level is low. These adjustments are controlled by two parameters defined as QuantIncrLimit[0] and QuantIncrLimit[1] in the example below; their default values may be set to 11. In the following example, RcSizeGroup represents the activity level, BitsCodedCur represents the actual number of bits used to code the most recently coded Group, and RcTgtBitsGroup represents the Target_activity_level. RcTgtBitOffset[0] and RcTgtBitOffset[1] are offset values that adjust the range of the target activity level. EdgeFactor is a parameter that is used to detect a strong edge. The quantization step of the last Group is Quant, which is saved as QuantPrev before it is assigned the value for the current Group.

The operation of the Quant adjustment may be implemented as follows:

```
if ( RcSizeGroup < (RcTgtBitsGroup – RcTgtBitOffset[0])
  && BitsCodedCur < (RcTgtBitsGroup – RcTgtBitOffset[0]))
{    QuantPrev = Quant;
     Quant = MAX(MIN_QP, (Quant–1));
}
else if (BitsCodedCur > RcTgtBitsGroup + RcTgtBitOffset[1])
{    if ((QuantPrev == Quant && RcSizeGroup * 2 < RcSizeGroupPrev * EdgeFactor) || (QuantPrev < Quant && RcSizeGroup < RcSizeGroupPrev *
EdgeFactor && Quant < QuantIncrLimit[0])
|| (Quant < QuantIncrLimit[1] ) )
     {    QuantPrev = Quant;
          Quant = MIN(MAX_QP, (Quant+1));} }
else QuantPrev = Quant;
```

When the buffer fullness approaches the maximum allowed level, the above Quant value determined by the activity level may be replaced by max_QP:

```
if (Buffer_fullness >= BufTh_overflow_avoid)
   *Quant = max_QP;
```

Where BufTh_overflow_avoid is a programmable parameter.

Figure 8:
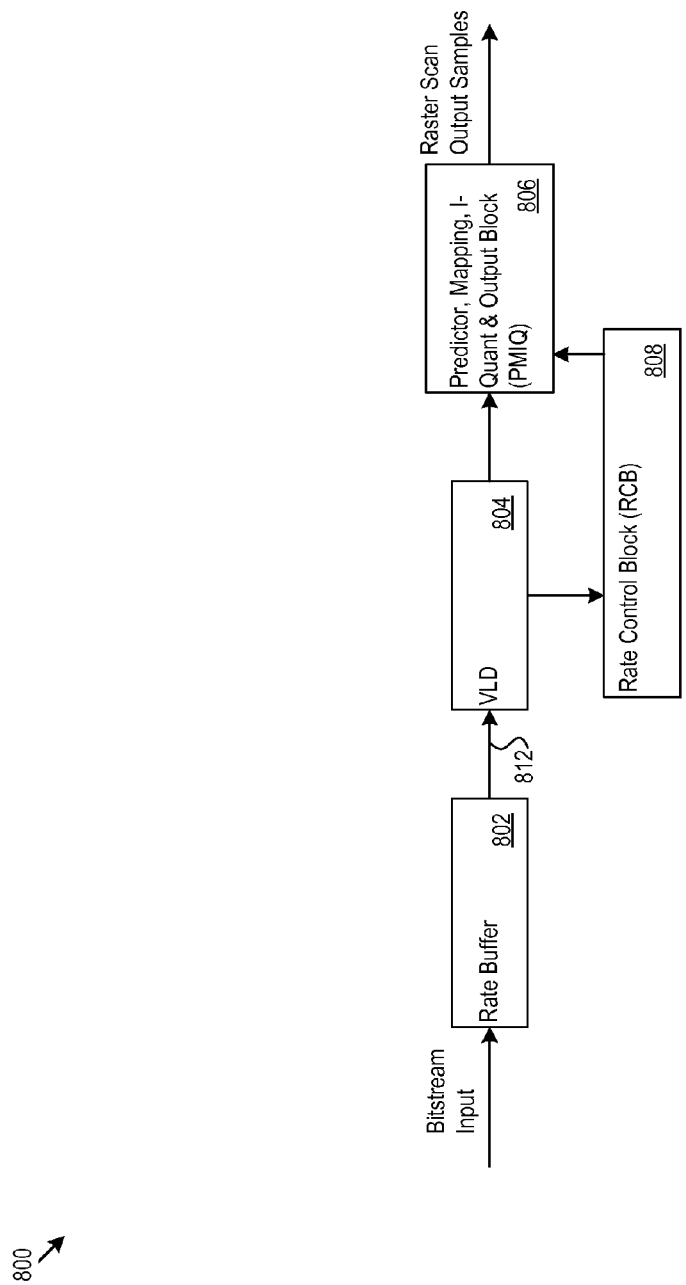
FIG. 8 shows an example decoder.

FIG. 8 shows an example decoder 800. The decoder 800 includes a rate buffer 802, a variable length decoder (VLD) 804, a predictor, mapper and inverse quantizer (PMIQ) 806, and a rate controller 808. The decoder 800 may be located in the same device or in a different device as the encoder, and may receive the bitstream input from any source, such as a memory or communication interface. For example, the decoder 800 may be located remotely from the encoder and receive the input bitstream via a network interface.

The rate buffer 802 may be a FIFO memory which temporarily stores compressed data bits after the encoder 800 receives them. The rate buffer 802 may be integrated with the rest of the video decoder or it may be located in another module, and it may be combined with another memory. The size of the rate buffer 802 may be at least as large as the virtual buffer used in the video encoder. For example, where the video encoder uses a 16 kbits virtual buffer, e.g., 2048 bytes, the rate buffer may be the same size, i.e., 2048 bytes or larger. Ready-accept flow control may be used between the rate buffer 802 and the VLD 804 to control that when the rate buffer 802 is empty the decoding operation is suspended until there is data available in the rate buffer 802.

The fullness of the rate buffer 802, at any given time, may not be the same as the fullness of the virtual buffer model. In part this is because the decoder virtual buffer model mimics the operation of the encoder virtual buffer model, and not the operation of the decoder, and the buffer model operates with the specified number of coded bits/pixel times the number of pixels in a Group being removed from the buffer model every time a Group is decoded, rather than the actual schedule at which bits arrive at the decoder. The transmission of compressed bits may be modeled as being exactly synchronized with the decompression function, while in actual operation the input of the rate buffer 802 may be read from memory more quickly or more slowly than exactly this rate. This is one reason that the rate control, above, operates on the buffer model and not on the rate buffer fullness.

The input to the VLD 804 is a compressed bit stream 812. The compressed bit stream 812 may include a series of Groups. The Groups may include a set of Units. Each Unit may have a Prefix and some number of samples, for example two, three or four samples. The VLD 804 operation is the inverse of the variable length coder (VLC) 206 function. Since the input to the VLD 804 is a stream of bits, e.g., a stream of VLC coded samples, part or all of the VLD operation may be performed sequentially. Some of the VLD functionality may be pipelined, however.

In one implementation, the VLD 804 uses a Unit size of 2, i.e., 2 samples per Unit. The choice of Unit size may be the same for both the encoder and decoder for any given image. The Unit size is generally an attribute of the encoded bit stream.

The VLD 804 decoding operation entails determining the actual sizes (e.g., number of significant bits) of the samples in the previous Unit of the same component as the one currently being coded, and creating a predicted Unit sample size from this information. This analysis may be pipelined. The VLD 804 may decode the Prefix of each unit, which may be unary coded. The decoded Prefix value is added to the predicted sample size value. The resulting sample size information indicates how many bits for each sample are contained in the Unit. The VLD 804 extracts from the incoming bit stream a number of bits equal to the prefix size plus the determined sample size times the number of samples per Unit. Once the VLD 804 extracts these bits, they are de-multiplexed and processed by subsequent decoding steps which may be pipelined.

Similar to the VLC, the number of bits spent for the current Group as well as the activity level of the current Group are calculated and passed to the rate controller 808 for rate control. The VLD 804 generates the values of RcSizeGroup and BitsCodedCur and passes these to the rate controller 808.

Once the coded samples are extracted, they are converted to a suitable format for subsequent processing. For example, they may be converted to an 11 bit 2's complement signed format, with sign-extension of negative sample values. These constant-width sample values are demultiplexed into individual component streams of samples, and sent to the Predictor, Mapping and I-Quant (PMIQ) block 806.

Figure 9:
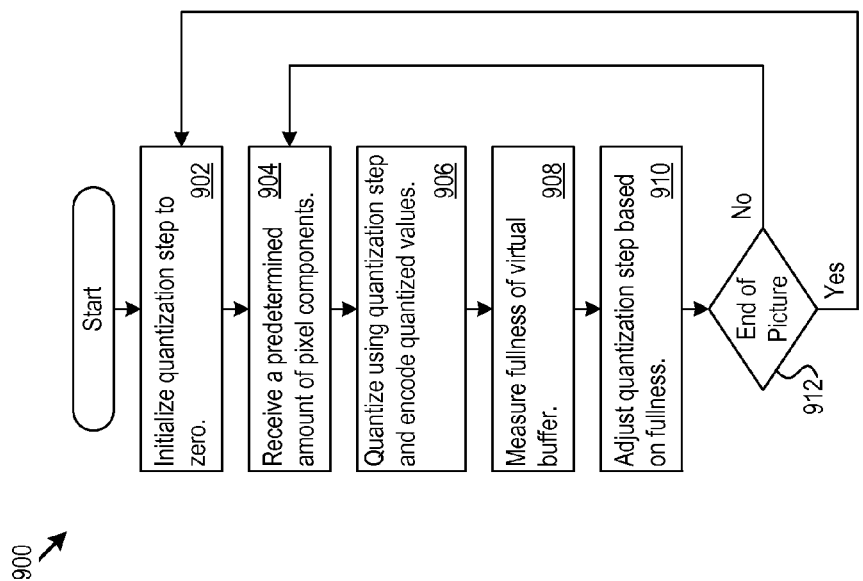
FIG. 9 shows example logic for encoding.

FIG. 9 shows example logic 900 for encoding. The logic 900 initializes the quantization step to zero (902) and receives a unit of pixel components (904). The logic 900 also performs quantization using the quantization step and encodes the quantized values (906). The logic 900 measures the fullness of the virtual buffer (908) and adjusts the quantization step based on the measured fullness (910). If the encoding is finished (912), flow may return to (902) or terminate altogether; otherwise flow may continue at (904).

Figure 10:
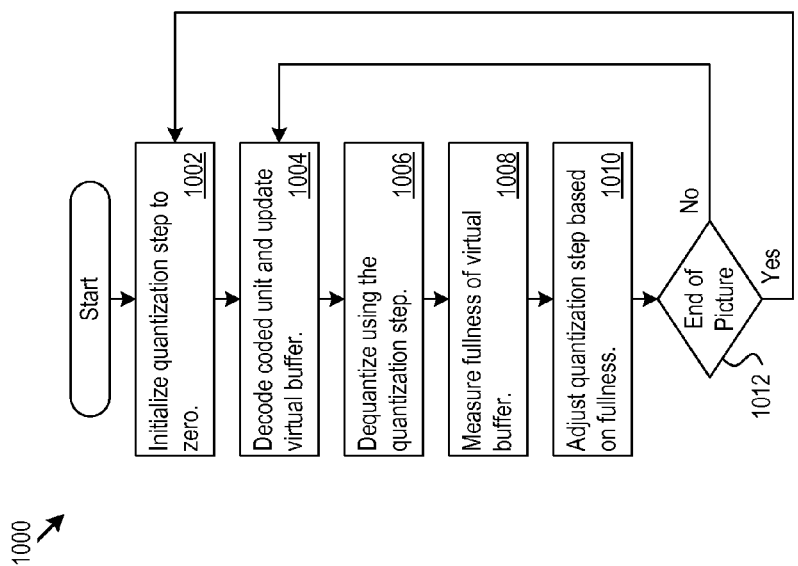
FIG. 10 shows example logic for decoding.

FIG. 10 shows example logic 1000 for decoding. The logic 1000 initializes the quantization step to zero (1002). The logic 1000 decodes a coded unit and updates the virtual buffer (1004). The logic 1000 also dequantizes using the quantization step parameter (1006), and measures the fullness of the virtual buffer (1008). Further, the logic 1000 may adjust the quantization step based on the measured fullness (1010). The logic 1000 determines whether decoding of the frame is finished (1012), and if so, flow may return to (1002) or terminate. Otherwise, the flow may return to (1004).

Operation Description

The description above provides an example architecture that supports additional specific image processing operations. An introduction to some of these operations is provided next. Additional architectural implementations that support the image processing operations are also discussed further below.

Figure 11:
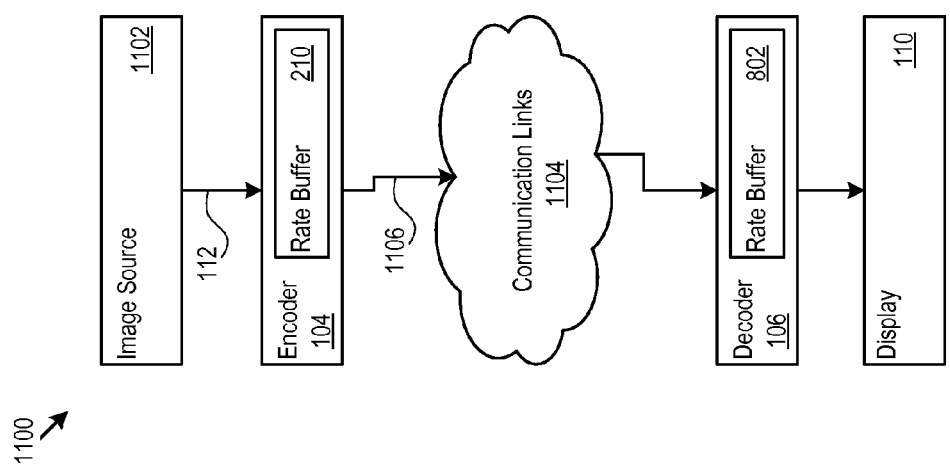
FIG. 11 shows an example encoding and decoding system.

FIG. 11 shows an example encoding and decoding system 1100, based on the example of FIG. 1. The system 1100 supports real time operation. Source data 112, which may be uncompressed, enters the encoder 104, for example in real time and raster scan order. The encoder 104 compresses incoming pixels to form a bitstream and temporarily stores portions of the bitstream in its rate buffer 210. The output of the rate buffer 210 is the slice layer of a Display Stream Compression (DSC) bitstream 1106. The DSC bitstream 1106 may be conveyed, e.g., in real time from the encoder 104 to the decoder 106. In that regard, a wide variety of communication links 1104 may convey the DSC bitstream 1106 to the decoder 106. Underlying the communication links 1104 may be a wide variety of transport layers, and the communication links 1104 may include local high speed busses, WiFi links, Ethernet links, satellite links, cellular (e.g., 3G or 4G/LTE) links, as examples.

The decoder 106 receives the DSC bitstream 1106 into its rate buffer 802, which temporarily stores portions of the DSC bitstream 1106. The VLD 804 decodes bits from the rate buffer 802 to obtain uncompressed pixels. The VLD 804 outputs the uncompressed pixels, e.g., in real time and in raster scan order, for the display 110. The image output from the decoding process may have the same format as the image input to the encoding process.

Figure 12:
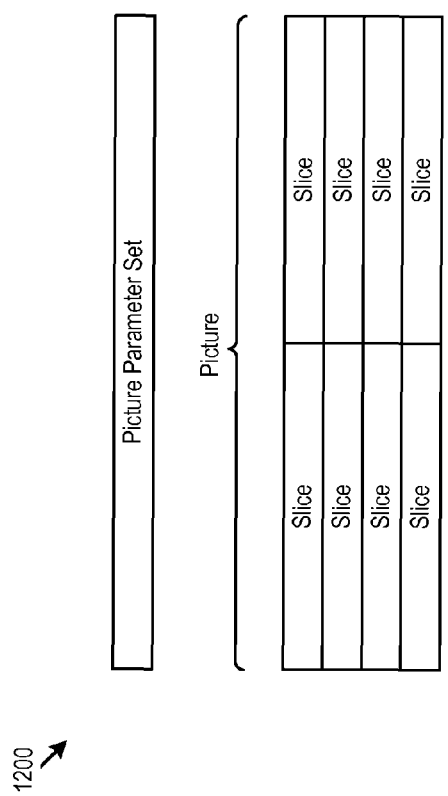
FIG. 12 shows an example of a picture and a picture parameter set.

The DSC bitstream may include of a sequence of frames coded using a picture layer syntax. The picture layer syntax may include a PPS (picture parameter set) and a slice syntax. The PPS contains parameters that the decoder 106 uses for correct decoding of the slice layer. FIG. 12 shows an example of a PPS 1200.

The picture layer may operate in units of entire pictures. A picture may be, as examples, a frame in the case of a progressive format video, or a field in the case of an interlaced format video. Each picture may include an integer number of contiguous, non-overlapping, identically-sized, rectangular slices. In the encoder 104, slice coding is specified via a slice layer. In the decoder 106, each slice may be decoded independently without reference to other slices. There may be one slice per line or multiple slices per line. In the case of multiple slices per line, bits from the slices covering one line are multiplexed in the DSC bitstream 1106 via a slice multiplexing process described below. Each slice may include a set of groups, and each group may be a set of three consecutive pixels in raster scan order. Further, the encoder 104 may encode each group with multiple (e.g., three) entropy codes, one for each component, and each of which may be a specific type of variable length code (VLC). Furthermore, some groups may include one or more additional bits which signal specific decoding operations.

Figure 13:
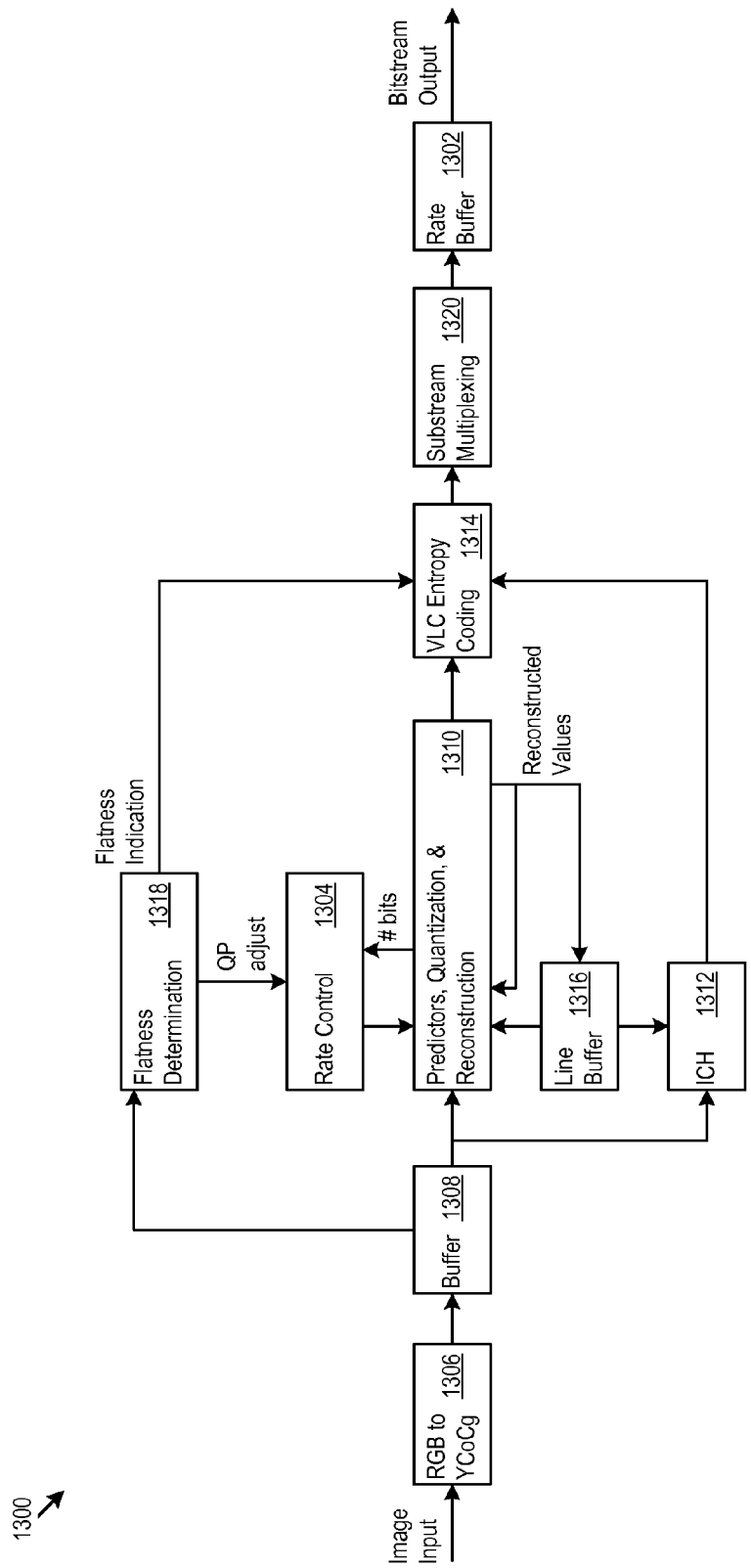
FIG. 13 shows another example of an encoder.

FIG. 13 shows another example of an encoder 1300. The DSC encoding process generates bitstreams that may precisely conform to the independently specified bpp (bits per pixel) rate. The bpp rate may be specified in terms of bits per pixel time, which may be algorithmically specified, as the unit of a pixel time is the same at both the input and output of the encoder 1300. The number of bits that code each pixel, or group of pixels, may vary considerably. In the encoder 1300, the rate buffer 1302 facilitates converting the variable number of bits used to code each group into, e.g., a constant bpp rate. To that end, the encoding process includes the rate controller 1304.

The encoder 1300 may include color space conversion logic 1306, e.g., RGB input to reversible YCoCg conversion logic. An input buffer 1308 stores the converted input. Prediction, quantization, and reconstruction (PQR) logic 1310 implements prediction of sample values and generation of residual values. The prediction, quantization, and reconstruction (PQR) logic 1310 may include multiple (e.g., three) predictors: modified median adaptive prediction (MMAP), mid-point prediction (MPP), and block prediction (BP). The PQR logic 1310 also implements quantization of residual values and reconstruction of sample values. An indexed color history (ICH) 1312 is also present, as is VLC coding logic 1314 that may implement entropy coding using delta size unit variable-length coding (DSU-VLC). The input buffer 1308 provides samples to the flatness determination logic 1318. Note also that substream multiplexing logic 1320 is present to prepare a multiplexed output stream to the rate buffer 1302.

Figure 14:
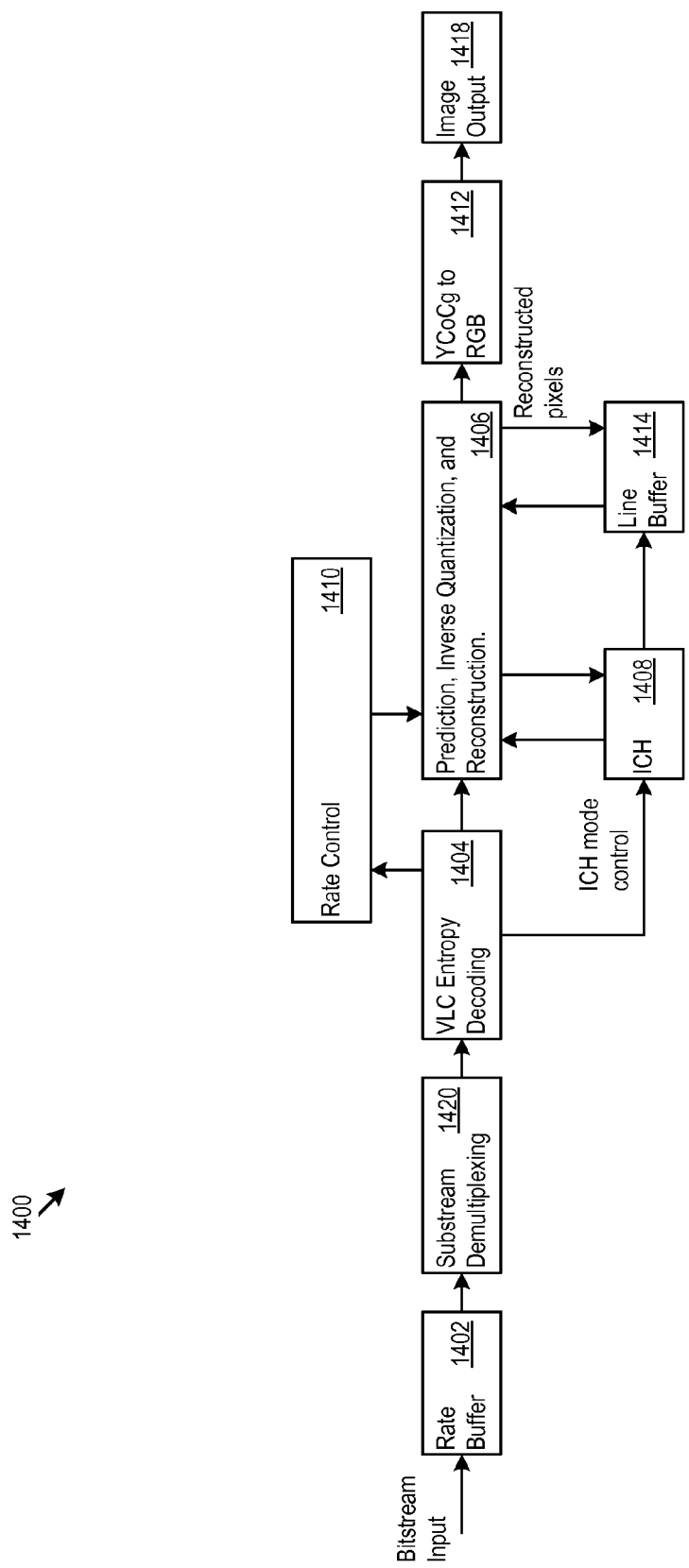
FIG. 14 shows another example of a decoder.

FIG. 14 shows another example of a decoder 1400 configured to decode image data that the encoder 1300 has encoded, and produce image output 1418. The decoder 1400 may implement the inverse of the operations that were performed by the encoder 1300. The decoder 1400 may include a rate buffer 1402, substream demultiplexer 1420, and VLC entropy decoding logic 1404 for DSU-VLC. The decoder 1400 also includes PQR logic 1406 that may implement multiple (e.g., three) predictors: modified median adaptive prediction (MMAP), mid-point prediction (MPP), and block prediction (BP). The PQR logic 1406 also performs inverse quantization of residual values and reconstruction of sample values. An ICH 1408, rate control logic 1410, and color space conversion logic 1412 is also present. Flatness indications may be signaled in the bitstream from the encoder, and provided to the rate control logic 1410.

The encoding process may produce display stream coded bitstreams that conform to an HRD (hypothetical reference decoder) constraint. The HRD may be idealized model of a decoder that includes a model of a rate buffer, which should neither overflow nor underflow.

The DSC bitstream and decoding process facilitate decoding 3 pixels per clock cycle in practical hardware implementations. In other implementations, the decoding process may process 1, 3, or other numbers of pixels per clock. Additional throughput in terms of pixels per clock may be increased via encoding and decoding multiple slices in parallel, which is facilitated by utilizing multiple slices per line in the DSC bitstream.

Color Space Conversion Logic 1306, 1412

RGB video input to the encoding process may be converted to YCoCg for subsequent processing. The reversible form of YCoCg may be used, and as such the number of bits per each of the two chroma components is one greater in YCoCg than it is in RGB. In the case of YCbCr input, no color space conversion need be performed. The inverse color space conversion is performed in the decoding process.

PQR Logic 1319, 1406

Each group of pixels is coded using either predictive coding (P-mode) or ICH mode. For P-mode there are three predictors: modified median-adaptive prediction (MMAP), block prediction (BP), and midpoint prediction (MPP). The encoder and decoder may select MMAP, BP, or MPP automatically, using the same algorithm in each, without signaling the selection in the DSC bitstream.

In the encoder 1300, each sample is predicted using the selected predictor. The original sample value is compared to the predicted value, and the difference is quantized. Each quantized error is then entropy-coded if P-mode is selected. The encoder 1300 also performs a reconstruction step wherein the inverse-quantized error is added to the prediction so that the encoder and decoder may use the same reference samples.

In decoder 1400, the samples are predicted using a selected predictor. The residual value, which is obtained from decoding the DSC bitstream, is inverse quantized and the result added to the prediction, forming the reconstructed sample value.

The median-adaptive predictor (MAP) may be the prediction method that is used in JPEG-LS. However, a modification is made to allow the decoder 1400 to process three pixels in a group in parallel and to improve coding. The modified median-adaptive predictor (MMAP) facilitates hardware implementations for decoders running at 3 pixels/clock. The MMAP predicts a current sample value as a function of reconstructed previously coded samples to the left and above the current sample. The encoder 1300 and decoder 1400 may use identical sets of reconstructed samples for this purpose, and hence the MMAP produces the same results in both the encoder 1300 and the decoder 1400. MMAP may be the default predictor, and is effective at predicting sample values in most conditions.

The MPP predicts a current sample from a value that is approximately at the mid-point of the valid range for the sample. The MPP has the benefit of bounding the maximum size of the residual. MPP may be selected in place of MMAP when the number of bits required to code the samples in of one component of a group would be greater than or equal to the bit depth for that component minus the quantization shift.

The BP predicts a current sample from a reconstructed previously coded sample to the left of the current sample in the same scan line. The offset from the current sample to the predictor position is a BP vector. The BP vector and the decision of whether or not to use BP are determined automatically by the BP function, which is the same in both the encoder and decoder.

Block Prediction

Block prediction may predict the current sample where the predictor is a sample to the left of the current sample, in the same line. The relative position of the reference sample may be between (−3) and (−10), inclusive. Using additional pixel locations may improve quality. The relative position is a vector within the same line of samples; this is referred to as the block prediction vector.

The search to find the best vector may be performed on the previous line of samples, rather than the line that is currently being coded. In one implementation, the block search compares a set of 9 consecutive samples with reference samples using various potential vectors with values ranging from −3 to −10. The current samples and the reference samples being compared are in the same scan line, e.g., the line above the line of the sample to be coded. For each vector considered, a SAD (sum of absolute differences) is calculated over 9 samples in each of the current and reference set. The vector with the lowest SAD value is selected. In cases of ties, the vector closest to 0 is selected.

The 9-pixel SAD of the vector −1 is also used in order to determine whether BP or MMAP should be used. More details of predictor selection are given below.

A vector, once selected, applies to each group of 3 samples. Therefore the block search is performed every 3 samples.

A vector means that the predictor for pixel X is the pixel that is to the left of pixel X in same line, the distance to the left in pixel units being equal to the vector value.

Figure 15:
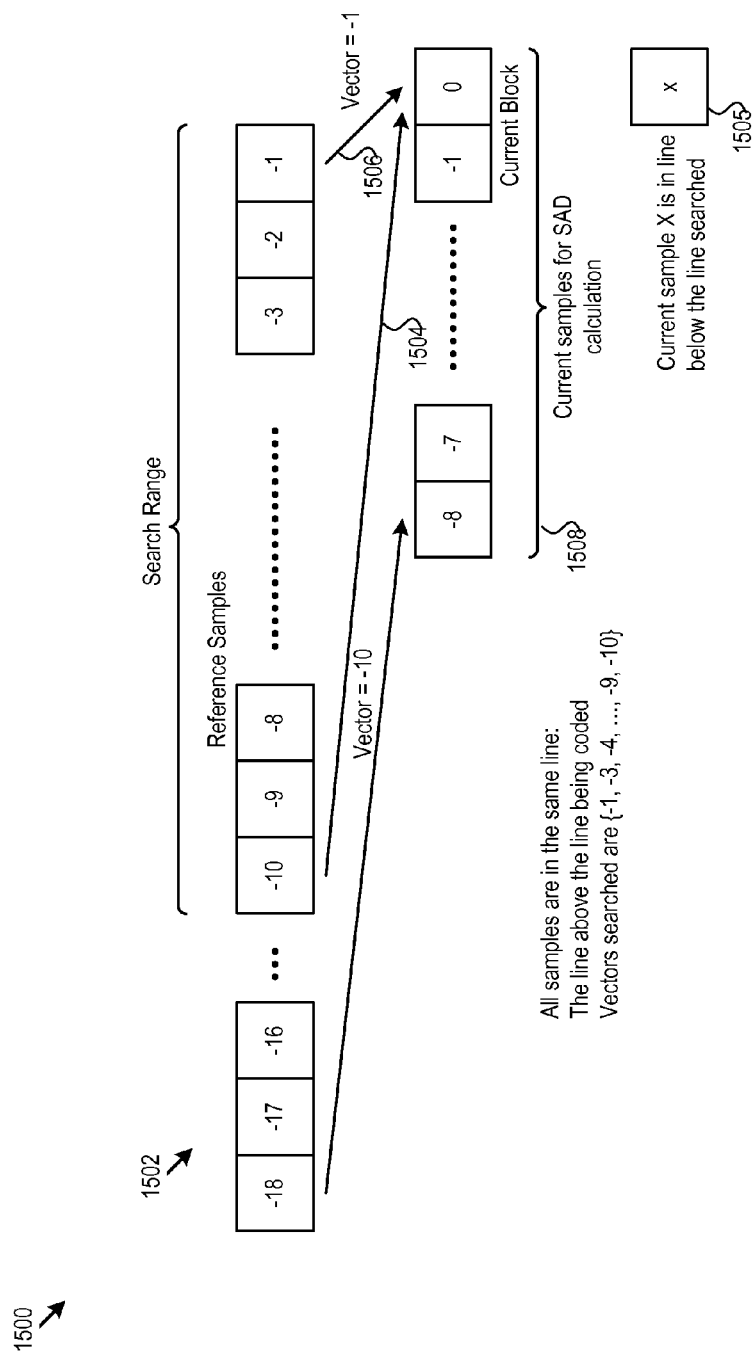
FIG. 15 illustrates samples sets for block search.

FIG. 15 illustrates example sample sets 1500 for block search, showing several reference samples 1502 and vectors 1504, 1506. An example of the current sample 'x' 1505 and the current SAD calculation samples 1508 are also shown. ICH logic 1312, 1408

Figure 16:
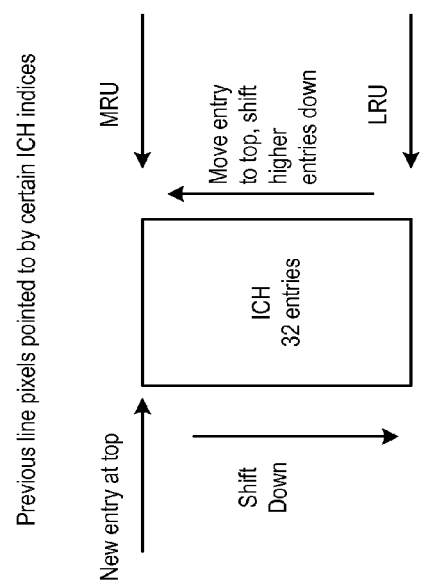
FIG. 16 illustrates an example of indexed color history.

FIG. 16 illustrates an example of ICH 1600.

In many types of content, such as computer-generated text and graphics, similar pixel values tend to appear in reasonably close proximity while not necessarily being adjacent to one another. Because of this, it can be helpful to keep track of a number of recently-used pixel values in the ICH. When the encoder 1300 selects ICH-mode for a particular group, it sends index values corresponding to the selected pixel values within the ICH. These index values are used directly in the output pixel stream.

The ICH logic includes a storage unit that maintains a set of recently used color values that were coded using another coding method such as predictive coding. The encoder 1300 and decoder 1400 may maintain identical states of the ICH. The ICH may have 32 entries, with an index value pointing to each entry. For groups that are ICH coded, each pixel may be coded with a 5-bit ICH index, which points to one of the entries. As each group of pixels is encoded in the encoder or decoded in the decoder in P-mode, the values of all the pixels in the group are entered into the ICH. The ICH may be managed as a shift register where the most-recently used (MRU) values are at the top and the least-recently used (LRU) values are at the bottom. New entries are added at the top and all other entries are shifted down, with the bottom entries falling out of the ICH. When a group is coded in ICH-mode, the three indices used to code those pixels reference entries in the ICH. When an ICH entry is referenced, it is moved to the top of the ICH and the other values above the prior location of the entry are shifted down by 1. This operation is performed in parallel for all 3 entries of each ICH coded group, and the most recent, e.g., the rightmost pixel value of the group becomes the MRU. The result is that the most recently used (MRU) value is at the top of the history and the least recently used (LRU) value is at the bottom of the history. Whenever a P-mode group of three pixels is added at top of the history, the three LRU values are removed.

For the first line each slice, all 32 ICH entries are treated as part of the shift register. For lines after the first line of a slice, the last 7 index values are defined to point to reconstructed pixels in the line above the current line, rather than entries in the ICH. This is useful for efficient coding of pixel values that are not in the history shift register, and it improves coding with some content.

ICH mode may be selected on a per-group basis by the encoder 1300. The encoder 1300 signals the use of ICH mode for a group using an escape code in the luma substream DSU-VLC. For each group coded in ICH mode, each pixel in the group is coded using a fixed-length 5 bit code, where the index values point into the history. The decoder 1400 decodes each ICH-coded group by determining the use of ICH mode via the bitstream syntax and decoding each pixel in the group by reading the values pointed to by the ICH indices that constitute the coded values of the pixels. Both the encoder 1300 and decoder 1400 update the ICH state identically every group by inserting P-mode pixels into the ICH and by re-ordering the ICH entries in response to ICH mode groups.

Entropy Coding Logic 1314, 1404

The display stream coding defines syntax at multiple layers. The lowest layer is called the substream layer. There may be three substreams in each slice, one for each component. The three substreams may be multiplexed together by a substream multiplexing (SSM) process to form a coded slice. If there is more than one slice per line, the coded slices may be multiplexed by the slice multiplex process; and if there is only one slice per line, the slice multiplex process is not used. The resulting bits of all slices are concatenated to form a coded picture. Each coded picture is optionally preceded by a picture parameter set (PPS).

Substream Layer

The display stream encoding may use an entropy coding technique referred to above as DSU-VLC for coding residuals associated with predictive coding. ICH coding of pixels uses a fixed-length code for each pixel. Specialized values are used to signal the use of ICH mode, and other codes signal quantization adjustments associated with flat regions of pixels.

TABLE 1

Examples of sizes for different residual values

| Residual values | Size in bits | Representation |
| --- | --- | --- |
| −3 | 3 | 101b |
| −2 | 2 | 10b |
| −1 | 1 | 1b |
| 0 | 0 | <none> |
| 1 | 2 | 01b |
| 2 | 3 | 010b |
| 3 | 3 | 011b |

The pixels in each slice may be organized into groups of three consecutive pixels each. A group is a logical construction employed by the encoding and decoding processes, but need not be directly represented in the bitstream. DSU-VLC organizes samples into units. A unit is the coded set of residuals of three consecutive samples of one component. Each unit has two parts: a prefix and a residual. The size of each residual is predicted based on the size of the three previous residuals of the same component type and any change in QP that may have occurred. The prefix may be a unary code that indicates the non-negative difference between the size of the largest residual in the unit and the predicted size. If the difference is negative, the value coded by the prefix is zero. The residual portion of each unit contains 3 values, one for each sample in the unit. The residual values are coded in 2's complement. The number of bits allocated to residuals can vary from unit to unit; however, all 3 residuals in one unit may be allocated the same number of bits.

In addition, the prefix for luma units also indicates whether or not ICH mode is used for each group. A transition from P-mode to ICH-mode may be indicated by an escape code, e.g., a prefix value that indicates a size that is one greater than the maximum possible residual size for luma. The maximum possible residual size for luma depends on the QP value that applies to luma in the group. An ICH-mode group immediately following another ICH mode group may be indicated by a luma prefix code consisting of a single "1" bit. A P-mode group immediately following an ICH-mode group may be indicated by a modified unary code.

For an ICH-mode group, the residual portion may be 5 bits for each component, where each 5 bit code is an ICH index which codes a complete pixel, and the chroma components do not utilize a prefix. For subsequent ICH-mode groups following an initial ICH-mode group, each group may use 16 bits for every group, e.g., a 1 bit prefix and (3) 5 bit ICH codes.

The luma substream may also contain some conditional fixed-length codes in the syntax for the purpose of the encoder conveying information about a transition from a busy area to a smooth area. This "flatness indication" is discussed in more detail below.

Substream Multiplexing

Figure 17:
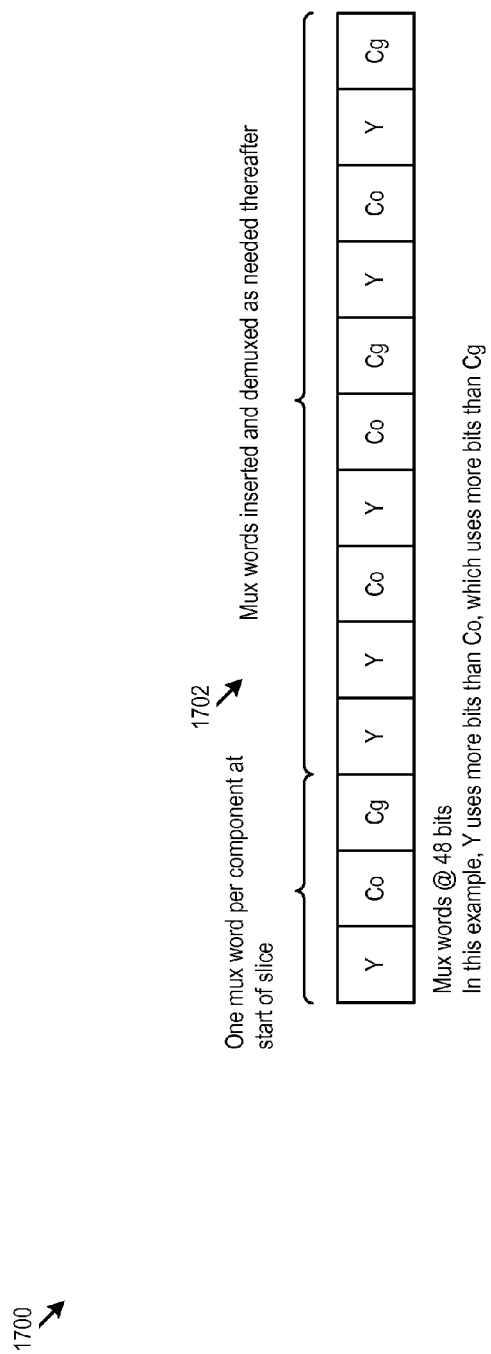
FIG. 17 shows an example of a portion of a slice using substream multiplexing.

The three component-wise substreams may be multiplexed together using a fixed-length substream multiplexing scheme with no headers. One technique for doing so is described in the U.S. Patent Publication Number 2011-0305282 A1, which is incorporated by reference. FIG. 17 shows an example of the results of substream multiplexing 1700, including various multiplexed words and components 1702. Each mux word may have an identical size, e.g., 48 bits for 8 or 10 bits per component (bpc), or 64 bits for 12 bpc. The order of the mux words and components 1702 is derived from the order in which parallel substream decoders use the data in order to decode in real time.

Figure 18:
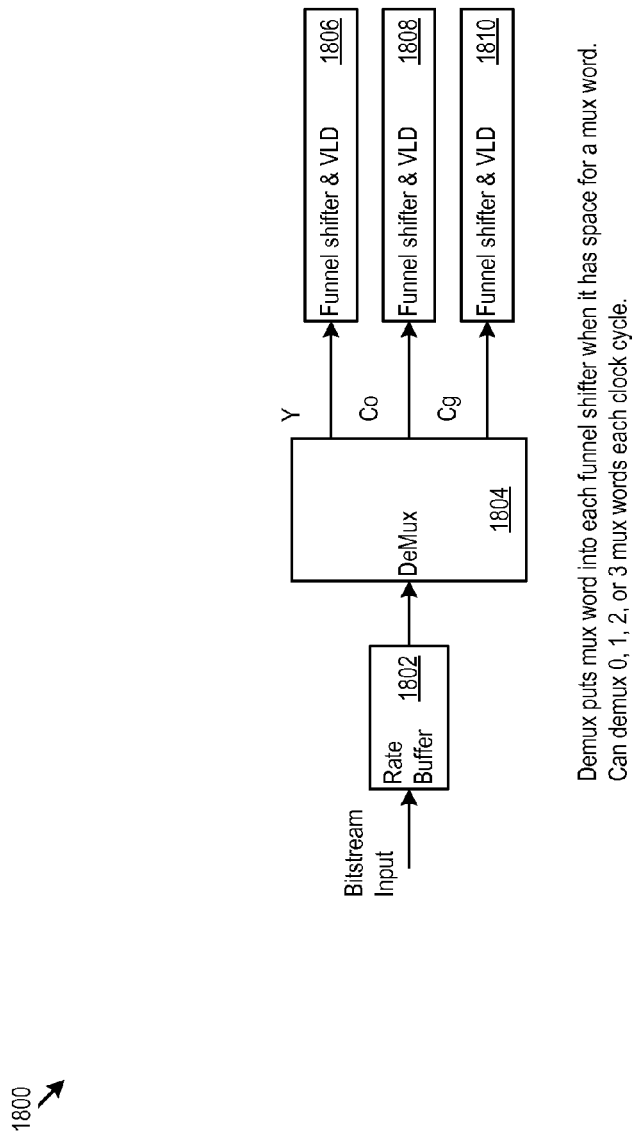
FIG. 18 shows an example of substream demultiplexing logic.

FIG. 18 shows an example of substream demultiplexing logic 1800. The logic 1800 includes a memory such as a rate buffer 1802, a demultiplexer 1804, and funnel shifters with VLD 1806, 1808, and 1810. The combination of the funnel shifter and VLD is referred to as a substream processor (SSP). At each group time, any combination of the SSP's may request a mux word or none at all. If a request is received from an SSP, the demultiplexer 1804 sends a mux word to that SSP. If multiple requests are received in the same group time, the demultiplexer 1804 sends a mux word to each SSP that made a request.

At the end of the slice, the SSP's may request mux words beyond the end of the substream layer data. Therefore, the encoder 1300 may insert padding mux words as needed at the end of the slice.

Figure 19:
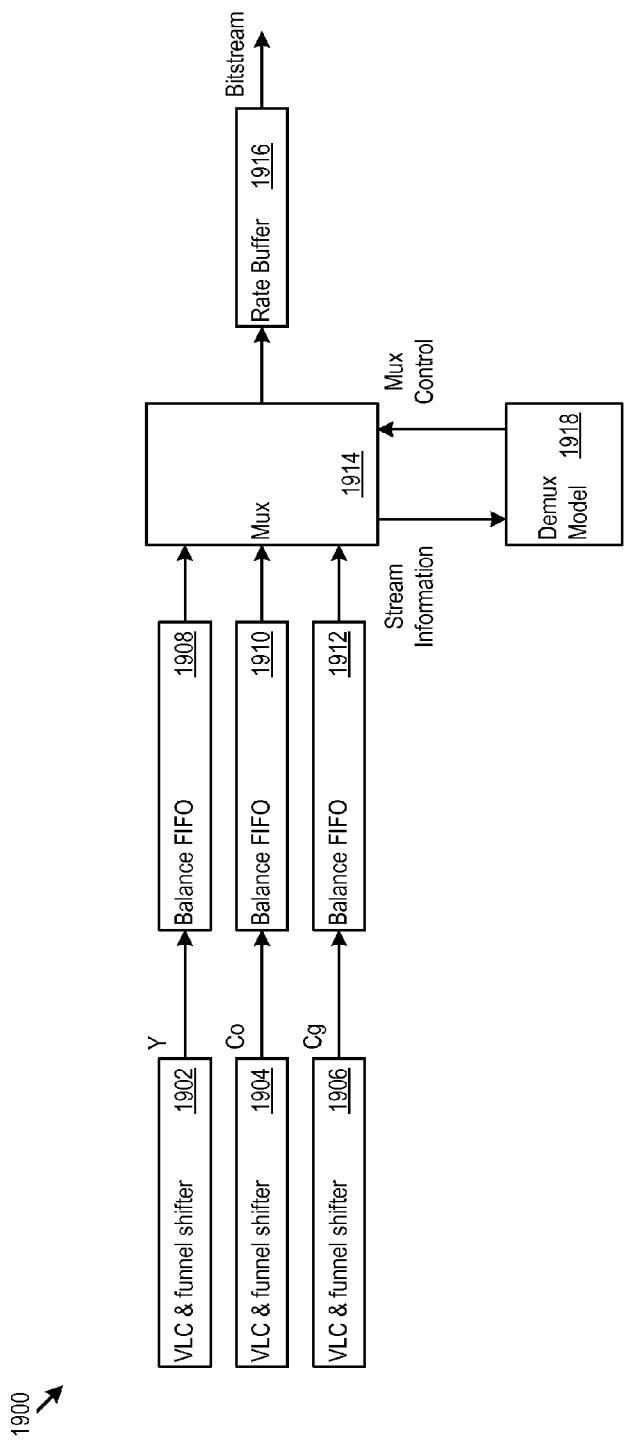
FIG. 19 shows an example of substream multiplexing logic.

FIG. 19 shows an example of the substream multiplexing logic 1900, including VLC and funnel shifters 1902, 1904, 1906, balance memories (e.g., FIFOs) 1908, 1910, 1912, a multiplexer 1914, rate buffer 1916, and demultiplexer model 1918. The demultiplexer model 1918 helps the encoder 1300 to order the mux words correctly. The balance FIFO's 1908, 1910, 1912 may store many groups worth of data in order to provide the mux words at the appropriate time.

Rate Control

The encoder 1300 and decoder 1400 may use identical rate control (RC) algorithms, configured identically. The decisions made by the RC algorithm to adjust QP in the encoder are mimicked in the decoder 1400, such that the decoder 1400 has the same QP value as the encoder 1300 at every pixel, without any bits being spent communicating the QP value, except for the flatness indication. RC decisions are made in the encoder 1300 and decoder 1400 based on information previously transmitted and received. RC can change the QP value every group.

Rate Control Goals

The RC provides the encoder 1300 and decoder 1400 with quantization parameters (QP) to use for each group. Since the RC function is the same on both the encoder side and the decoder side, the base QP value is known to both encoder 1300 and decoder 1400, and it does not need to be transmitted in the bitstream. However, the base QP value or adjustments to the QP value may be sent in the bitstream for flatness indication, described below.

The RC attempts to ensure hypothetical reference decoder (HRD) conformance. There is a model of an idealized rate buffer (FIFO) that converts a varying number of bits to code each group into a specified constant bit rate. The RC is designed to ensure that this FIFO will not overflow or underflow assuming that bits are removed at an assumed constant bit rate.

The RC optimizes picture quality in its QP decisions. It is desirable to use a lower QP on relatively flat areas and a higher QP on busy areas due to perceptual masking. In addition, it is desirable to maintain a constant quality for all pixels; for example, the first line of a slice has limited prediction, and may therefore use an additional bit allocation.

HRD Buffer Model

A hypothetical reference decoder (HRD) model describes the behavior of an idealized rate buffer in a decoding system. An encoder rate buffer model may be mirrored on the decoder side. The encoder model tries to ensure that there are no overflows or underflows. Since the DSC may be constant bit rate (CBR), the HRD model fullness is equal to buffer size—encoder buffer fullness; therefore, the decoder buffer model does not overflow or underflow. The DSC encoder rate buffer model may define a schedule for bits entering and leaving the rate buffer.

During the initial delay, e.g., initial transmission delay, the encoder generates bits into its rate buffer every group, but no bits are removed. During this period, the encoder model fullness increases according to the number of bits that are generated. The delay period may be specified in terms of group times or pixel times, as examples.

As long as there are more pixels in the slice to be encoded, the encoder generates bits according to the content. Bits are removed at the constant rate that is specified. To prevent the buffer fullness from dropping below 0, the prediction mode may be overridden to use MPP, which enforces a minimum data rate. Once the last group of a slice has been encoded, no more bits are added to the rate buffer. Bits continue to leave the rate buffer at the constant rate until the buffer becomes empty, after which the encoder sends zero bits to ensure that the compressed slice size in bits is equal to bpp*number of pixels in slice, in CBR operation.

The decoder initial delay is specified as the complement of the encoder initial delay; e.g., the HRD delay minus encoder initial delay. The decoder rate buffer fullness then tracks as the complement of the encoder buffer fullness.

CBR vs. VBR

Under conditions when the encoder rate buffer would otherwise underflow, there is a design choice of whether the encoder inserts bits to prevent underflow, or it uses variable bit rate (VBR). To prevent underflow, the RC determines whether underflow is possible after the next coded group, and when this condition occurs it forces MPP mode which enforces a minimum bit rate. The decoder does not require any special logic to handle stuffing, as it decodes the extra bits just as it would any other group.

It is possible to support VBR. With VBR, the encoder 1300 stops sending bits under certain conditions when it would otherwise underflow and has no bits to send (Off). The encoder 1300 then starts sending bits again at some identified event (On). To make on-off VBR compatible with a general HRD that does not depend on the real time behavior of the transport, the off and on events may be specified.

With VBR, the encoder stops sending bits when it would otherwise underflow and has no bits to send. The encoder's RC process operates once per group. At each group, it adds to the buffer model the number of bits that code the group, and normally it subtracts from the buffer model the nominal number of bits per group, which is 3*bpp, adjusted as necessary to form an integer number of bits. With VBR, if this subtraction of bits/group from the buffer model fullness would result in a negative value of fullness, the RC subtracts the normal number of bits and then clamps the buffer fullness to zero, i.e. the model fullness is never allowed to be negative. In a real system with a real transport and real decoder, when the encoder has no bits to send, e.g. its real rate buffer is empty, the transport does not send any bits and the decoder does not receive any bits. The decoder's real rate buffer may be full, but it does not overflow. When the encoder does have bits to send, transport is expected to transmit them at the normal rate and the decoder receives them at that rate. The decoder's real buffer does not overflow or underflow, and the decoder does not have to do anything special to handle VBR. The transport should understand when there is and is not valid data available to send and receive.

Slices

The number of bits that code a picture may be equal to the number of pixels of that picture times the specified bpp rate. Further, any subset of slices of a picture may be updated in place in a compressed frame buffer by over-writing the previous version of each of the corresponding slices. One consequence is that a complete picture can be transmitted as a series of consecutive slices comprising the entire picture, and that an entire picture transmitted as a series of consecutive slices meets the same requirement as for slices, e.g., the number of bits equals the number of pixels times the bpp rate, and also the entire picture comprising slices should conform to an appropriate HRD model to ensure correct real time buffer behavior with this mode of operation. One consequence is that the delay from the start of transmission to the start of decoding and the delay from the end of transmission to the end of decoding are the same as one another and the same for each slice.

The algorithm uses a rate buffer model, which may be referred to as a rate buffer. The algorithm allows the encoder's rate buffer to have up to a specified fullness, e.g., a maximum number of bits, at the end of each slice. If at the end of coding a slice the encoder's buffer has fewer bits than this maximum number, it may pad the remaining bits at the end with 0s, for example, to produce exactly the required number of bits. This final number of bits occupies a specified number of pixel times to transmit at the specified bpp rate. This number of pixel times is the delay from the end of encoding to the end of transmission, which may be called the final transmission delay. The total rate buffer delay, in units of pixel times, in the combination of an idealized encoder and decoder is equal to the rate buffer size divided by the bpp rate. The initial transmission delay, from the start of encoding a slice until the start of transmission of that slice, is the same as the final transmission delay. The initial decoding delay, e.g., the delay in the HRD timing model from the start of reception of a slice to the start of decoding of the slice is set equal to the total end-end rate buffer delay minus the initial transmission delay. This permits correct operation per the description above.

Figure 20:
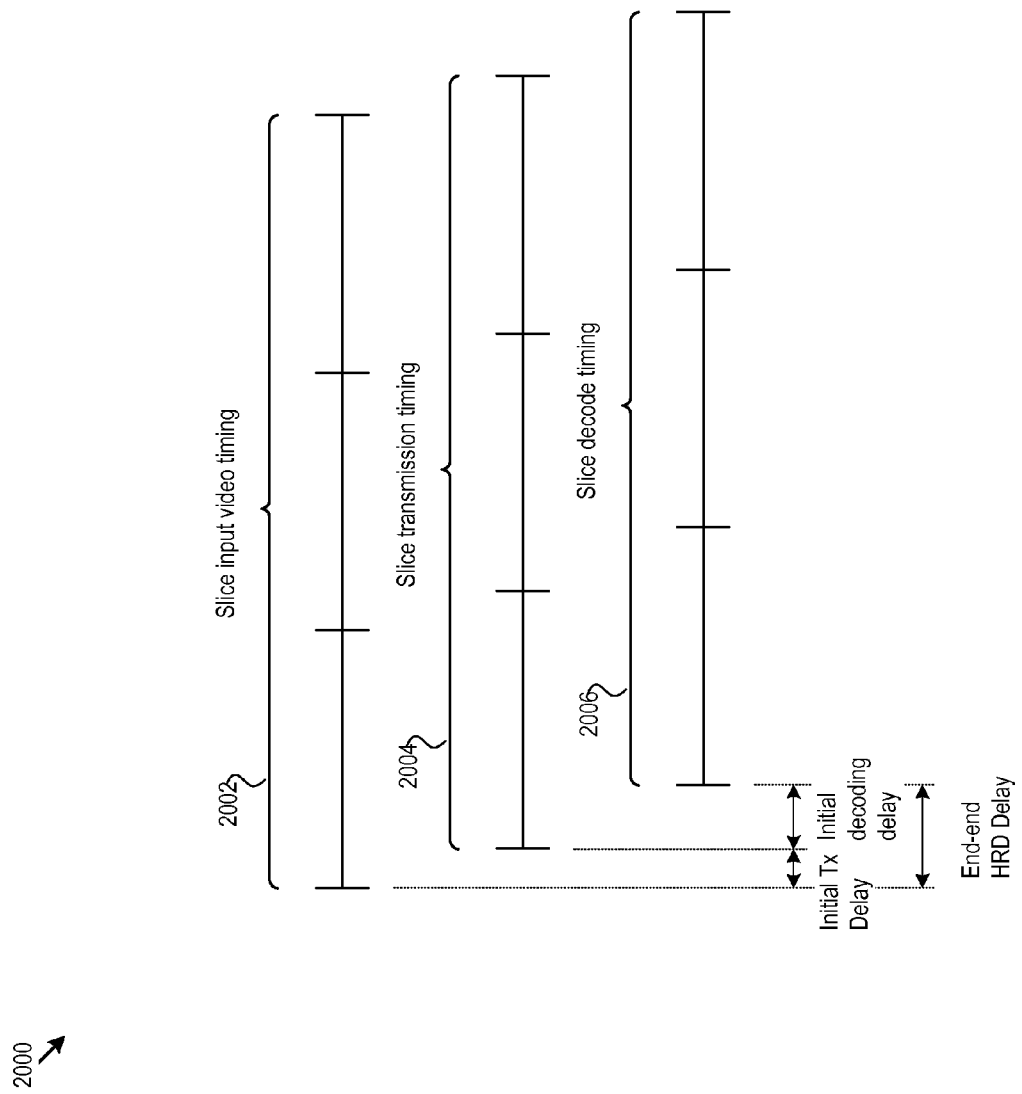
FIG. 20 shows an example of slice timing and delays.

FIG. 20 shows an example of slice timing and delays 2000. FIG. 20 shows slice input video timing 2002, slice transmission timing 2004, and slice decoding timing 2006. The algorithm may have a fixed parameter value for the maximum number of bits that can be in the encoder buffer at the end of a slice, typically ~4 kbits. The resulting ending transmission delay is a function of the bpp rate; it is set to ceiling(4096/bpp_rate). At 8 bpp, this delay is 170 group times, and at 12 bpp it is 114 group times. The initial delay may be set to this value.

The end-end HRD delay is equal to the HRD buffer size divided by the bpp rate. For example, if the HRD buffer size is 19,836 bits and the rate is 12 bpp, the end-end HRD delay is floor(19,836/36)=551 group times. This is actually an upper bound, and the HRD delay could be set to a lower value, however if a lower value were used then the algorithm would not be able to take full advantage of the available buffer size for purposes of RC.

The initial decoding delay, which applies directly to the HRD and indirectly to real decoders, should be set to the HRD delay—initial transmission delay. In the example here, where the initial transmission delay is set to 114 group times as above, the initial decoder delay is 551−114=437 group times. This is a delay that applies to the HRD, i.e. an idealized hypothetical decoder. A real decoder is of course free to have additional delay.

The algorithm's rate buffer size, which is also the HRD buffer size, can be selected by an encoder as long as it does not exceed the capabilities of compatible decoders. The optimum rate buffer size is a function of several factors including the bpp rate and the width of slices.

Note that the initial transmission delay is typically a function of bpp rate. The HRD rate buffer size may be set by the encoder as long as it does not exceed the capabilities of decoders. It is practical to design real systems with adjustable bit rate and constant end-end delay, from video into the encoder to video out of the decoder, and with constant delay from compressed data into the decoder to video put of the decoder. An encoder may set the initial transmission delay and the initial decoder delay to selected values to facilitate seamless changes of bit rate with constant delay.

Options for Slices

The encoder 1300 and decoder 1400 support a wide variety of slice widths and heights. One configuration is slice width=¼ picture width and slice height=32 lines. Another possible configuration is slice width=picture width and slice height=8 lines. The slice dimensions can be specified up to the picture width by the picture height. To minimize extra data that may need to be sent, equal-sized slices may be used throughout the picture.

Taller slices may lead to better compression. Extra bits are allocated to the first line of each slice to maximize quality and to prevent artifacts at the boundaries between slices. The number of extra bits allocated per group on the first line is set via a parameter in the PPS. The numbers of bits available to all lines after the first line each slice may be reduced in order that the total number of bits per slice is the number of pixels times the bpp rate. The more lines there are after the first line in each slice, the less reduction in bit allocation is required. Therefore a slice height of 32 lines typically gives better performance than a slice height of 8. There is no cost associated with slice height—there is no additional buffering nor any other additional resources. The encoder 1300 and decoder 1400 support a slice size equal to the entire picture size.

Slices narrower than the full screen width may be desirable for various practical purposes. Narrower slices provide the ability to update, via partial update, a narrower slice, or to facilitate parallel processing at low cost. In practice, multiple slices per line can use one line buffer the size of the picture width. With multiple slices per line, and slices that are taller than one line, the rate buffers for the different slices may be independent. For example, with four slices per line, a practical implementation would use four rate buffers. The sizes of each rate buffer can be specified to be smaller for the case of 4 slices/line than they would normally be specified for the case of one slice/line, as the optimum rate buffer size is a function of the slice width, although not exactly proportional. Hence there is a small increase in the total amount of rate buffer space when there are multiple slices per line, while there is no increase in the total amount of line buffer space.

Slice Multiplexing

In systems configured to use more than one slice per scan line, the compressed data may be multiplexed according to a specific pattern in order to minimize cost in both encoders and decoders. The recommended pattern is as follows. For an integer number S of slices per line, each slice has P pixels per line, and the picture is W pixels wide. Preferably P is equal for all slices, equal to W/S, which is preferably an integer. The multiplexed bit stream contains a number of bits=P*bpp rate for the first slice of the first row of slices, then P*bpp rate for the 2nd slice of the first row, and so on for all slices of the first row.

One iteration of this pattern has W*bpp rate bits, which may be the same number of bits as would have been used if there were one slice per line. If P*bpp rate is not an integer, an adjustment can be made to result in an integer number of bits per slice. For example, the number of bits included for one line of one slice may be the integer truncated value of P*bpp plus the accumulated residual amount from previous truncations. Then this pattern repeats as many times as needed to transmit all the bits of all slices in the first row of slices. An application specification, for example a transport specification that is designed to carry DSC compressed image data, may carry data from different slices in separate packets. In that case, the last bits from one slice may be in a separate packet from those of other slices, including the first bits of the vertically adjacent slice immediately below the first one. Alternatively an application specification may choose to package the last bits of one slice with the first bits of another slice, for example a horizontally adjacent neighboring slice or a vertically adjacent neighboring slice. The overall pattern may repeat for the entire image. It is not necessary to include markers or other indications in the bit stream indicating which bits are for which slice. Instead, the transport layer may provide such indicators.

Additional information on slice multiplexing follows.

Slice multiplexing may occur when VBR is disabled, e.g., stuffing is enabled. When stuffing is disabled, the number of bits coding each slice may vary, e.g., the DSC operation is VBR. Pictures include some number of slices. Slices may be identically-sized when possible, e.g., when the ratio of picture width to slice width is an integer. In case this ratio is not an integer, the widths of the columns of slices may be set to integer values that differ by no more than 1, and whose sum is the picture width. Slice multiplexing is possible also when VBR is enabled as well. The memories used and multiplexing pattern will depend on characteristics of the link, including for example, the overhead required to enter or leave a low-power state.

With VBR disabled (stuffing enabled) slices of the same width are coded using the same number of compressed bits. When the slice width is equal to the picture width, the slice layer data is sent sequentially (slice 0, slice 1, . . . , slice N−1, where N is the number of slices). When the slice width is shorter than the picture width, the slice data for all slices on the same line may be multiplexed into fixed-length chunks.

The length of each chunk may be equal to floor (bits_per_pixel*slice_width). The floor( ) function is used since bits_per_pixel may be fractional. For example, in a case where the picture is split into two equal-sized slices on each line, the multiplexed bitstream would contain:

Slice 0 chunk/Slice 1 chunk/Slice 0 chunk/Slice 1 chunk . . . .

The final chunks of each slice may be padded with zero bits if needed due to the ceil( ) function.

With VBR enabled, the number of bits of coding each slice may differ from P*bpp rate. For example, the number of bits may be less than this value. The number of bits per chunk may differ from floor(bits_per_pixel*slice_width), for example the number of bits may be less than this value. Slices may be multiplexed using chunks of unequal numbers of bits. The numbers of bits per chunk may be indicated for example by packet length information or marker codes in a transport layer.

The display stream coding may be specified in terms of components that are labeled Y, Co, and Cg. If the convert_rgb flag is equal to 0 in the current PPS, the encoder may accept YCbCr input. The Cb component may be mapped to the Co component label. The Cr component may be mapped to the Cg component label. In this case, the bit depth of the Cb/Co and Cr/Cg components may be equal to the Y component, whose bit depth is specified using the bits_per_component field in the current PPS. If the convert_rgb flag is equal to 1 in the current PPS, the encoder may perform color-space conversion from RGB to YCoCg. The color space conversion may be:

$cscCo = R - B$ $t = B + (cscCo >> 1)$ $cscCg = G - t$ $y = t + (cscCg >> 1)$

The cscCo and cscCg values have one additional bit of dynamic range compared with Y. The final Co and Cg values may be centered around the midpoint:

$Co = cscCo + (1 << bits\_per\_component)$ $Cg = cscCg + (1 << bits\_per\_component)$ Note that here, the bits_per_component variable may represent the number of bits of each of the R, G, and B components, which is one less than the number of bits per component for the Co and Cg components. If a slice extends beyond the right edge of a picture, the right-most pixel in each line of the picture may be repeated to pad the slice to the correct horizontal size. If a slice extends beyond the bottom edge of a picture, the bottom-most pixel in each pixel column of the picture may be repeated to pad the slice to the correct vertical size.

Line Storage

The display stream compression may include buffer memory to hold the previous line's reconstructed pixel values for MMAP prediction and ICH. In some cases, a decoder line buffer may have sufficient storage to contain the full-range reconstructed samples. However, some decoders may choose to use a smaller bit depth to lower the implementation cost.

If a smaller bit depth is used, the decoder may communicate this to the encoder. The encoder may set the linebuf_width according to what the decoder implementation supports. The following method for bit-reducing samples may be used:

shiftAmount=MAX(0,maxBpc−linebuf_width);

round=(shiftAmount>0)?(1<<(shiftAmount−1)):0;

storedSample=(sample+round)>>shiftAmount;

readSample=storedSample<<shiftAmount;

where maxBpc is the bit depth of the current component, storedSample is the sample value that is written to the line buffer, and readSample is the value that is read back.

Prediction Types

There are three prediction types that may be supported in P-mode: MMAP, BP, and MPP.

Modified Median-Adaptive Prediction (MMAP)

The modified median-adaptive predictor is specified in the table below.

TABLE 2

| Pixels surrounding current group | | | |
|---|---|---|---|
| c | b | d | e |
| a | P0 | P1 | P2 |

Table 2 shows the labeling convention for the pixels surrounding the three pixels in the group being predicted (P0, P1, and P2). Pixels 'c', 'b', 'd', and 'e' are from the previous line, and pixel 'a' is the reconstructed pixel immediately to the left.

A QP-adaptive filter may be applied to reference pixels from the previous line before they are used in the MMAP formulas below. A horizontal low-pass filter [0.25 0.5 0.25] may be applied to the previous line to get filtered pixels filtC, filtB, filtD, and filtE. For example, filt$B = (c + 2*b + d + 2) >> 2$;

The filtered pixels may be blended with the original pixels to get the values that are used in MMAP (blendC, blendB, blendD, blendE). The following method is used for the blending:

```
diffC = CLAMP(filtC − c, −QuantDivisor[qlevel]/2,
QuantDivisor[qlevel]/2);
blendC = c + diffC;
diffB = CLAMP(filtB − b, −QuantDivisor[qlevel]/2,
QuantDivisor[qlevel]/2);
blendB = b + diffB;
diffD = CLAMP(filtD − d, −QuantDivisor[qlevel]/2,
QuantDivisor[qlevel]/2);
blendD = d + diffD;
diffE = CLAMP(filtE − e, −QuantDivisor[qlevel]/2,
QuantDivisor[qlevel]/2);
blendE = e + diffE;
```

The predicted value for each is given below:

```
P0 = CLAMP(a + blendB − blendC, MIN(a, blendB), MAX(a,
blendB));
P1 = CLAMP(a + blendD − blendC + R0, MIN(a, blendB, blendD),
MAX(a, blendB, blendD));
P2 = CLAMP(a + blendE − blendC + R0 + R1, MIN(a, blendB,
blendD, blendE), MAX(a,blendB, blendD, blendE));
``` where R0 and R1 are the inverse quantized residuals for the first and second samples in the group.

In the case of the first line of a slice, the previous line's pixels are not available. So the prediction for each pixel becomes:

```
P0 = a;
P1 = CLAMP(a + R0, 0, (1<<maxBpc) −1) ;
P2 = CLAMP(a + R0 + R1, 0, (1<<maxBpc) −1) ;
``` where maxBpc is the bit depth for the component that is being predicted.

Block Prediction (BP)

The BP predictor is a pixel value taken from a pixel some number of pixels to the left of the current pixel. The "block prediction vector" (bpVector) is a negative value that represents the number of pixels to the left to use for the prediction. In one implementation, the block prediction vector is always between −3 and −10 inclusive, which means that it uses samples outside of the current group.

The BP predictor is used to predict all three components from the pixel referred to by the block prediction vector:

P[hPos]=recon[hPos+bpVector];

So the predicted values for the 3×1 group correspond with the reconstructed pixels values for the 3×1 set of pixels that is pointed to by the block prediction vector.

Midpoint Prediction

The midpoint predictor is a value at or near the midpoint of the range, and depends on the value of the reconstructed pixel immediately to the left of the current pixel (pixel "a" in Table 2).

midpointPred=(1<<(maxBpc−1))+(a&((1<<qLevel)−1));

where maxBpc is the bit depth for the component being predicted, and qLevel is the quantization level that applies to the current component.

Predictor Selection

Block prediction is supported by the encoder 1300. The encoder 1300 may choose to disable block prediction in the stream (e.g., because the attached decoder does not support block prediction or because the picture would not benefit from block prediction) by setting block_pred_enable in the PPS equal to 0. In this case, MMAP is selected over block prediction, and the algorithms in this section are not used.

The decision to use either BP or MMAP may be made on a group basis using information from the previous line. This means that the decision can be made up to a line time in advance of processing the current group if it helps the implementation. The group referred to in this section starts at a horizontal location of hPos pixels from the leftmost pixel column in the slice.

Figure 21:
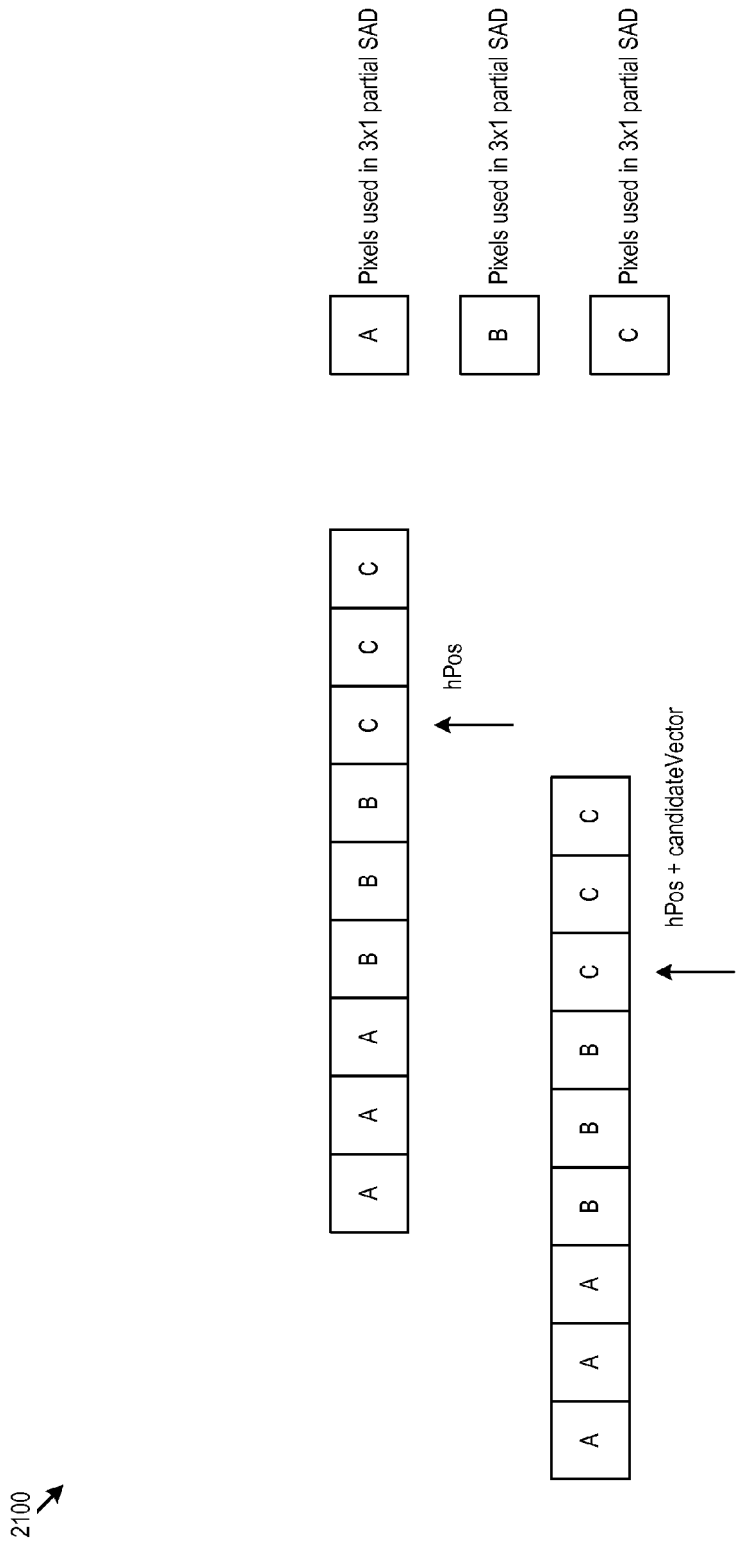
FIG. 21 shows an example of 3×1 partial SADs that form 9×1 SAD.

FIG. 21 shows an example 2100 of 3×1 partial SADs that form 9×1 SAD. First, a search may be performed to find the best block prediction vector. The reference pixels for the SAD may be the set of 9 pixels in the previous line starting at a horizontal location of hPos−6. The SAD is computed between the reference pixels and 9 different block prediction candidateVector's (−1, −3, −4, −5, −6, −7, −8, −9, and −10) pointing to the previous line's pixels. The 9-pixel SAD is computed as a sum of 3 3-pixel SAD's (see FIG. 21). First, each absolute difference may be truncated and clipped before being summed in the 3-pixel SAD according to:

modifiedAbsDiff=MIN(absDiff>>(maxBpc−7),0x3F);

where maxBpc is the bit depth for the current component.

The resulting 6-bit modifiedAbsDiff values are summed over each set of three adjacent samples and over the 3 components, resulting in a 10 bit value that represents the 3×1 partial SAD for one component; this 10-bit value is clamped to 9-bits (e.g., values greater than 511 are clamped to 511). Three 9-bit 3-pixel partial SAD's are summed to get the final 9-pixel SAD, which is an 11-bit number. The 3 least significant bits (LSBs) of each 9×1 SAD are truncated before comparison:

bpSad[candidateVector]=MIN(511,sad3×1_0[candidateVector]+sad3×1_1[candidateVector]+sad3×1_2[candidateVector]);

The 9 9-pixel SAD's are compared to one another, and the lowest SAD may be selected, with ties broken by selecting the smallest magnitude block prediction vector. If the lowest SAD block prediction vector is −1, the bpCount counter is reset to zero and MMAP is selected for this group. If the lowest SAD block prediction vector is not −1, the candidate BP vector becomes the vector with the lowest SAD, and the bpCount counter is incremented unless hPos<9.

BP may be selected if the following conditions are all true:

The bpCount value is greater than or equal to 3.

lastEdgeCount is less than 9. The lastEdgeCount value represents the number of pixels that have gone by since an "edge" occurred. An "edge" occurs when ABS(current sample−left sample)>32<<(bits_per_component−8) for any component.

Selecting Between BP/MMAP and MPP

The encoder may decide whether to use BP/MMAP based on the size of the quantized residuals that would be generated if BP/MMAP were selected. For example, the encoder may determine the maximum residual size for BP/MMAP for each of the three components. If the maximum residual size for any component is greater than or equal to a threshold such as maxBpc−qLevel for that component, then MPP may be selected for that component.

In addition, the encoder may select MPP in order to enforce a minimum data rate to prevent underflow.

Quantization

The predicted value of each sample of the pixel is subtracted from the corresponding input samples to form the residual sample values E, one for each component of the pixel.

E=x−Px, where x is input,Px is predicted value.

Each residual value E may be quantized using division with truncation by a divisor that is a power of 2 and using rounding with a rounding value that is 1 less than half the divisor.

```
If E<0 QE = (E−ROUND) /DIVISOR
Else QE = (E+ROUND) /DIVISOR
// the "/" operator is div with truncation as in C
```

Where:

```
DIVISOR = 2**gLevel = 1 << gLevel
ROUND = DIVISOR/2 − 1
```

The value of qLevel may be different for luma and chroma and is determined by the rate control (RC) function.

MPP quantized residuals may be checked to ensure that their sizes do not exceed a threshold such as maxBpc−qLevel, where qLevel is the quantization level for the component type (luma or chroma) and MaxVal is the maximum possible sample value for the component type. If an MPP residual exceeds this size, the encoder may change the residual to the nearest residual with a size of maxBpc−qLevel.

Inverse Quantization and Reconstruction

The encoder may follow the same process used in the decoder to arrive at the reconstructed pixel values. For pixels that are predicted using MMAP, BP, or MPP, the reconstructed sample value may be:

reconSample=CLAMP(predSample+
(quantized_residual<<qLevel),0,maxVal);

where predSample is the predicted sample value, quantized_residual is the quantized residual, qLevel is the quantization level for the component type (luma or chroma), and maxVal is the maximum possible sample value for the component type.

Flatness QP Override

Figure 22:
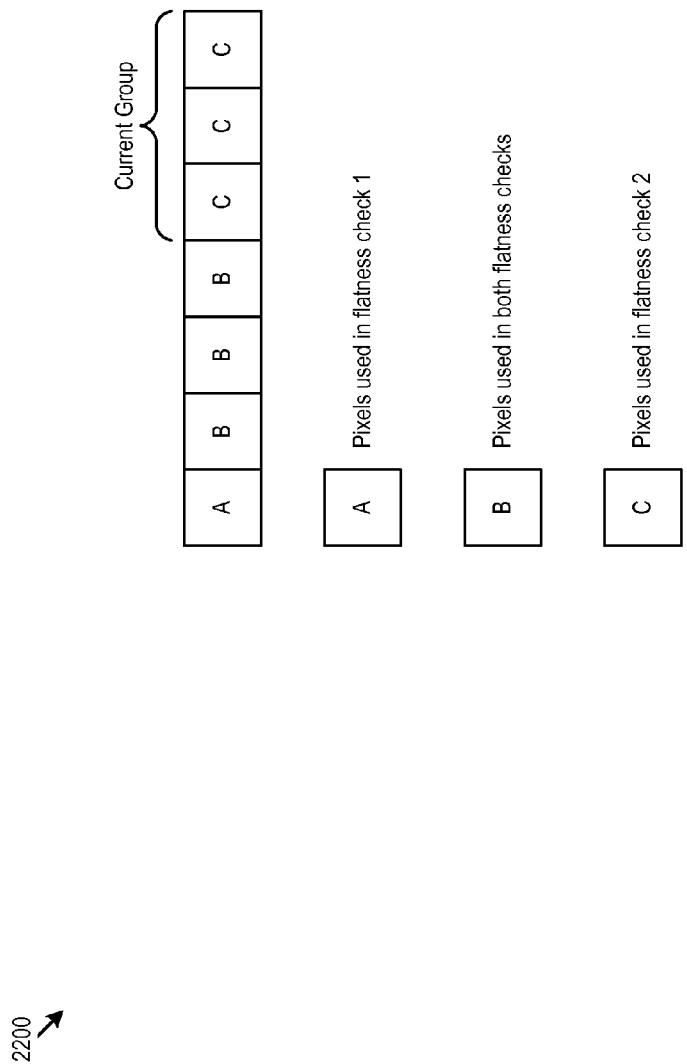
FIG. 22 shows an example of original pixels used for encoder flatness checks.

FIG. 22 shows an example 2200 of original pixels used for encoder flatness checks. Encoders generate a "flatness signal" if upcoming input pixels are relatively flat to allow the QP to drop quickly. The encoder algorithm to determine the flatness bits in the syntax is described below, as is the algorithm that both the encoder and decoder follow to modify the QP.

Encoder Flatness Decision

A set of 4 consecutive groups is called a supergroup. The encoder examines each supergroup before it is encoded in order to determine which, if any, of the groups are "flat". The first supergroup starts with the 2nd group in the slice as shown in FIG. 22. Supergroups may be defined consecutively within the slice. A supergroup that includes the last group of a line may wrap around to include groups on the subsequent line.

The flatness determination may be done for each group within the supergroup independently and includes a determination of the "flatness type" (e.g., either somewhat flat or very flat) for each group. Two flatness checks may be performed, both using pixels from the original, uncompressed image.

Flatness check 1 determines the MAX and MIN value among the samples shown in FIG. 22 for each component. A value of flatQLevel is determined for each component:

flatQLevel=MapQpToQlevel(MAX(0,masterQp−4));

The masterQp value that is used is the one that is used for rate control for the 2nd group to the left of the supergroup that is being tested. MapQptoQlevel maps the masterQP value to qLevelY (luma) and qLevelC (chroma) values that are used for both luma and chroma. For example, a masterQP value of 0 may map to qLevelC and qLevelY values of 0, values 1 and 2 may map to qLevelC values of 1 and 2 respectively, and successive unit increases in masterQP may map to unit increases alternating between qLevelY and qLevelC.

If the MAX−MIN for any component is greater than (2<<(bits_per_component−8)), the check for very flat fails for flatness check 1; otherwise, it passes. If the MAX−MIN for any component is greater than QuantDivisor [flatQLevel], the check for somewhat flat fails for flatness check 1; otherwise, it passes.

If flatness check 1 indicates that the group is either somewhat flat or very flat, that result is the final result that is used for the group. If both fail, flatness check 2 is performed over the 6 pixels indicated in FIG. 22. The same comparisons are done as in flatness check 1, except that the MAX and MIN are computed over 6 samples rather than 4. The final result of flatness check 2 is then used as the final result for the group.

For a given supergroup, there are then four flatness indications of either very flat, flat, somewhat flat, or not flat. The value of prevIsFlat is initialized to 1 if the previous supergroup had a flatness indication; otherwise it is initialized to 0. The following algorithm is used to distill the flatness information into a single flatness location and type:

```
Loop over four groups in supergroup {
    If !prevIsFlat && group is either very flat or somewhat flat
        Current group and flatness type is signaled
    Else
        prevIsFlat = 0;
}
```

If no group is selected, no QP modification is made and flatness_flag for the supergroup is set to 0 in the entropy decoder. If a group is selected, the flatness_flag for the supergroup is set to 1, and the corresponding group is signaled as the first_flat group in the bit stream along with its associated flatness_type. The entropy encoder will only signal flatness_flag if the masterQp value is within the range of flatness_min_qp and flatness_max_qp, so no adjustment is made in the RC if the corresponding masterQp is out of range.

The encoder flatness searches do not span to the next line. If a group within a supergroup falls on the next line, it is not considered to be flat. However, the first group of a line may contain the next_flatness_flag syntax element assuming the syntax allows it at that point.

Flatness QP Adjustment

The encoder and decoder make the same QP adjustment for a group where a flatness indication has been made. The RC receives a flatness signal corresponding to a particular group within a supergroup that may be either "somewhat flat" or "very flat". It should be noted that if the current masterQp is less than 7<<(2*(bits_per_component−8)), the flatness indication may be assumed to be "somewhat flat".

For a "very flat" signal, the QP is adjusted as follows:

masterQp=1<<(2*(bits_per_component−8));

For a "somewhat flat" signal:

masterQp=MAX(stQp−4,0);

If there is no flatness signal for a particular group:

masterQp=stQp

If the flatness QP override modifies the masterQp, the modified masterQp is used as the starting point for the short-term rate control on the next RC cycle.

Hybrid Predictive—Transform Coding

In some implementations, differential pulse code modulation (DPCM) may be utilized to encode pixels of an image. A DPCM coding scheme may utilize a predictor. One of the predictors described is the MAP. For example, a MAP may be used as a LS predictor.

In various implementations, compression schemes can use a transform or filter bank to organize input samples by spatial frequency, for example, to separate high spatial frequencies from low spatial frequencies. Transforms and filters may include the discrete cosine transform (DCT), discrete sine transform (DST), discrete wavelet transform (DWT), Hadamard transform, quadrature mirror filters (QMF), filter banks, and/or other transforms and filters. A DWT may be, for example, a LeGall(5,3) wavelet transform. In another example, a transform may be implemented as a 4×1 transform using the 4-tap transform specified in the H.264 standard. Another example transform may include a 4×2 transform where the horizontal dimension is transformed using the 4-tap transform specified in the H.264 standard and the vertical dimension is transformed using a 2-tap Haar transform.

In some implementations, the output values of the transforms may be used as coefficients for frequency components in bands, sets or other frequency component groups. The high frequency coefficients tend to be less correlated than the low frequency coefficients. Because of this, prediction for the high frequency coefficients may be less accurate than prediction for low frequency components.

In some implementations, a DPCM and MAP based coding scheme may be applied to at least a subset of the samples in an image. The DPCM and MAP based coding scheme may be combined with a transform coding scheme to code at least a subset of the samples in an image using a hybrid scheme. In one implementation, DPCM coding may be utilized to code a portion of a set of transformed coefficients. In such an implementation, a MAP may be used to predict the values of the low-frequency ("LF") coefficients of a transformed signal and the prediction residual may be encoded using DPCM. A transform may be applied in one dimension, referred to as 1D, for example the horizontal dimension. Alternatively a transform may be applied in two dimensions, referred to as 2D, for example the horizontal and vertical dimensions.

Additionally or alternatively, other coding schemes may be combined with transform coding schemes in a hybrid mode. For example, block coding, ICH mode, or other point coding schemes may be combined with transform coding in a hybrid mode. Point coding schemes may include virtually any coding scheme that does not rely on frequency decomposition (or decomposition in other transform spaces) of the input stream. In some implementations, the hybrid mode may use dynamic selection as described above. Additionally or alternatively, as discussed elsewhere, some point coding schemes may be applied for coefficient encoding of some elements of the transform-decomposed input stream.

In various implementations, a transform may be applied to the input stream. The transform may generate coefficients that may be grouped into sets according to spatial frequency. For example, the transform may generate high and low frequency coefficients. Examples of low-frequency coefficients may include the DC term of a DCT or the low-frequency band of a wavelet transform. Different implementations may classify different sets or bands of coefficients differently. In one implementation, the transform used in a hybrid coding scheme may be a 1D DWT with one stage producing two outputs, referred to as low frequency (LF) and high frequency (HF). The LF coefficients may be coded using a predictor-based coding scheme. As discussed above, a predictor-based coding scheme may be advantageous for encoding low frequency coefficients because of their lack of correlation with one another. For example, DPCM coding using a MAP predictor may be implemented. The HF coefficients may be coded using quantization and entropy coding, such as DSU-VLC. Coded LF and HF coefficients may be combined into one bit stream for transmission. A decoder may parse the bit stream to recover the coded LF and HF coefficients, decode the LF coefficients using DPCM and MAP, decode the HF coefficients, and perform inverse DWT to recover a decompressed version of the input pixels.

In various implementations, LF coefficients may refer to coefficients that affect pixels or other data elements over an extended spatial range. For example, a wavelet may transform a set of input samples into HF and LF coefficients such that the value of a single LF coefficient may be based on the values of multiple input samples, and upon application of a corresponding inverse wavelet transform the value of a single LF coefficient may affect multiple output samples. In some implementations, for example, three to ten pixels may affect a single LF coefficient. In various implementations, the value of each HF coefficient may be affected by fewer than six pixels.

In an example scheme, a 2D DWT with one stage per dimension, both stages producing LF and HF outputs, may be implemented. 2D DWT processing with one stage for each of the horizontal and vertical dimensions may result in four types of coefficients: LF in both dimensions (low low frequency, LLF), LF in the horizontal dimension and HF in the vertical dimension (low high frequency, LHF), HF in the horizontal dimension and LF in the vertical dimension (high low frequency, HLF), and HF in both dimensions (high high frequency, HHF). DPCM coding may be applied to any one or a subset of these coefficients. For example, the LLF coefficients may be DPCM coded using prediction based on other LLF coefficients, the LHF coefficients may be DPCM coded using prediction based on other LHF coefficients, the HLF coefficients may be DPCM coded using prediction based on other HLF coefficients, and the HHF coefficients may be coded using another coding scheme. For example the HHF coefficients may be coded without the use of prediction.

In some implementations, more than one set (or band) of coefficients may be considered low-frequency. Coefficients within a frequency band may be used to predict other coefficients from that same band. High-frequency coefficients tend to be uncorrelated with other coefficient in the same band, so prediction is less likely to be helpful for high-frequency coefficients compared to prediction with lower-frequency coefficients. HF coefficients may be coded using uncorrelated coding schemes. An uncorrelated coding scheme may be a coding scheme that does not implement prediction, or alternatively, using a prediction scheme where the prediction value is a constant, such as zero.

Figure 23:
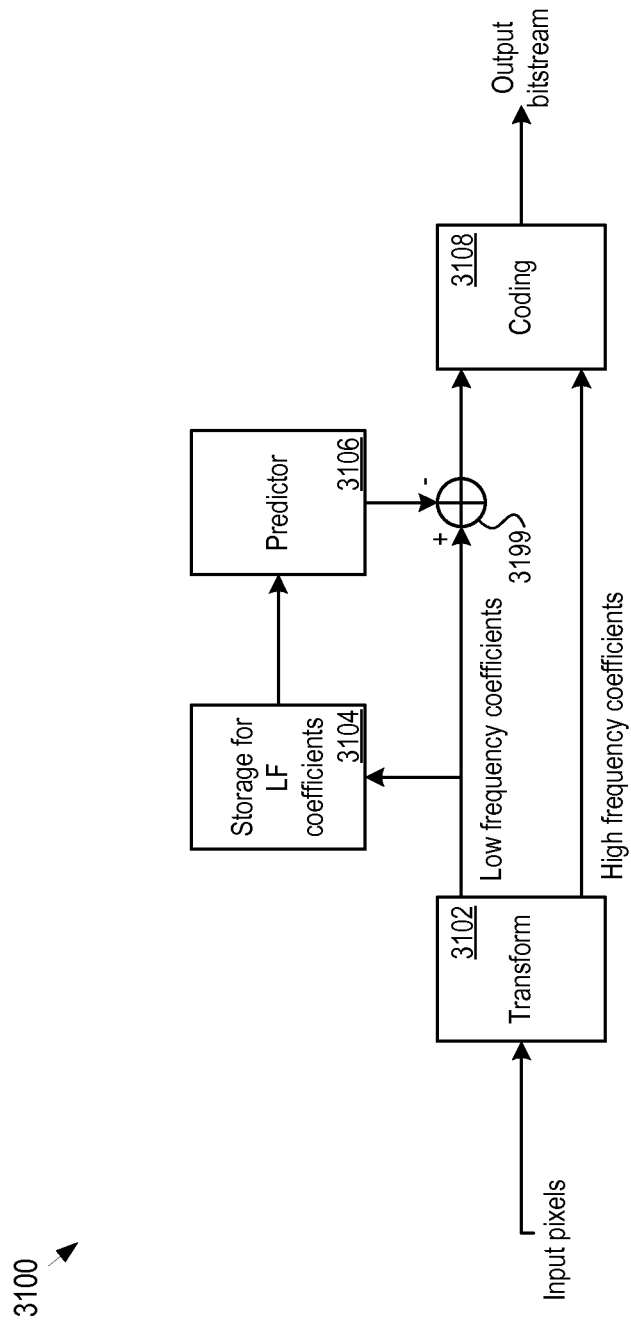
FIG. 23 shows an example encoder.

FIG. 23 shows an example encoder 3100. The example encoder may implement hybrid mode coding. The transform circuitry 3102 may decompose the input pixel stream into LF and HF frequency bands and generate associated respective coefficients. The HF coefficients may be supplied to the coding circuitry 3108 as inputs. The LF coefficients may be supplied to a storage element 3104, such as a cache or buffer, for use as reference coefficients in determination of prediction values for LF coefficients at the predictor circuitry 3106. For each LF coefficient, a corresponding predicted value may be subtracted, at summer 3199, from the LF coefficient and the difference, which may be referred to as a residual, may be supplied to the coding circuitry as an input. The LF coefficients may therefore be predictively coded. The predictively coded LF coefficients and the coded HF coefficients may be combined into an output stream. In various implementations, the coding circuitry 3108 may implement an entropy coding technique.

Figure 24:
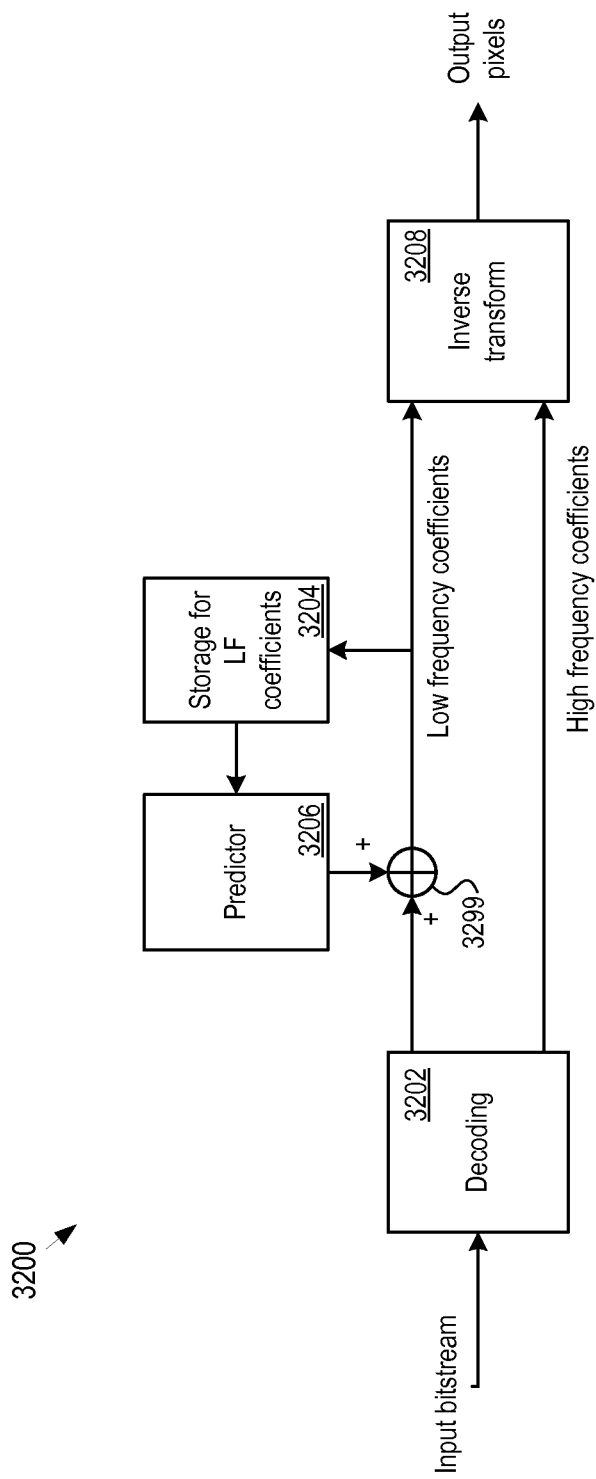
FIG. 24 shows an example decoder.

FIG. 24 shows an example decoder 3200. The example decoder may implement hybrid mode decoding. The decoding circuitry 3202 may extract the predictively coded LF coefficients and the HF coefficients. The HF coefficients may be supplied to the inverse transform circuitry 3208 as inputs. A predictor 3206 produces prediction values based on previously decoded LF coefficients. For each predictively coded LF coefficient, e.g. residual, a corresponding predicted value may be added, at summer 3299, to the LF residual value to form the corresponding LF coefficient. The LF coefficients may be supplied to a storage element 3204, such as a cache or buffer, for use by the predictor circuitry 3206 to form prediction values. The LF coefficients may be supplied to the inverse transform circuitry 3208 as inputs. The result of the inverse transform applied to the LF and HF coefficients may form the reconstructed pixel stream. In various implementations, the decoding circuitry 3202 may implement an entropy decoding technique.

In some implementations, the low-frequency coefficients may have significant degrees of correlation in either or both of the horizontal and vertical dimensions. A MAP predictor may be used in an encoder and in a decoder to predict the low-frequency coefficient values. The MAP predictor may be based on one or more coefficients horizontally and/or vertically displaced from the current coefficient, as discussed above. In some implementations, such as one comprising a function to encode LHF coefficients, one dimension may have a higher expected degree of correlation than another dimension. Various implementations may use predictors with vectors, weighted averages, or predictor selection, with the prediction designed to take advantage of the dimension with the higher degree of correlation. Other prediction techniques, such as block prediction, where the coefficient value may be predicted horizontally from a coefficient value to the left. The selection of the prediction mode can be explicit or implicit if multiple prediction modes are available in a coding scheme.

Figure 25:
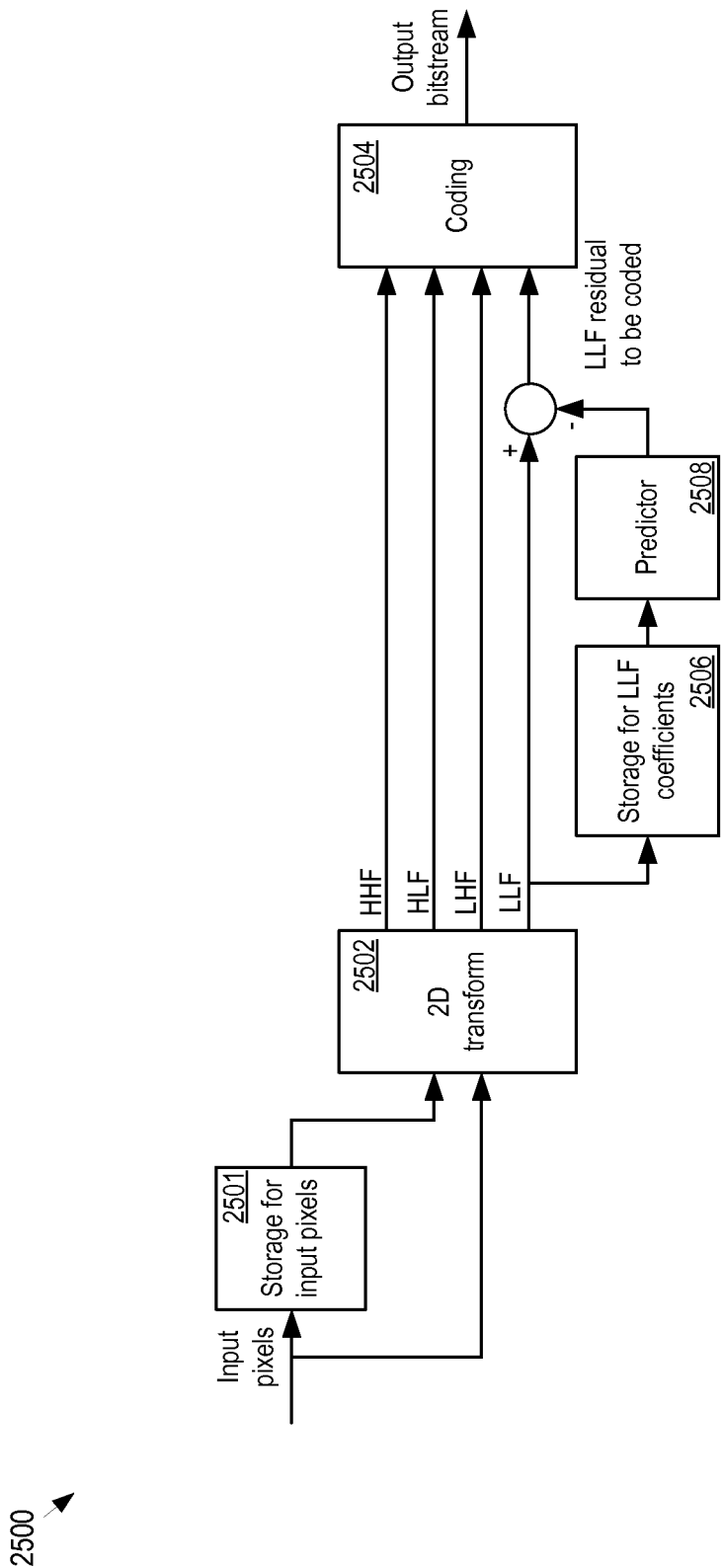
FIG. 25 shows an example encoder.

FIG. 25 shows an example encoder 2500. The example encoder 2500 implements a 2-dimensional (2D) transform. Some input pixels are stored at storage for input pixels block 2501 and then may be transformed at the 2D transform block 2502. For example, pixels from one scan line may be stored temporarily and later transformed concurrently with pixels from the next scan line. The 2D transform may generate four frequency bands. In the example implementation shown in FIG. 25, prediction may be applied to the LLF coefficients. To implement the prediction, the LLF coefficients may be stored at store for LF coefficients block 2506, and then predictors may be derived from the stored values at predictor block 2508. In various implementations, although not shown, prediction may be implemented in two-dimensions for the LLF coefficients and in one dimension for the HLF and LHF coefficients. The transformed values may be coded at coding block 2504. Although also not shown, multi-dimensional transform coding may be implemented along with quantization as discussed below.

Additionally or alternatively, a modified MAP coding scheme may be implemented. For example, the MAP may be derived from reference data which has been processed using quantization-adaptive filtering such as is described in U.S. patent application Ser. No. 61/832,547, filed 7 Jun. 2013, previously incorporated by reference.

In some implementations where quantization is applied, use of a greater quantization level for the high-frequency coefficients than for the low-frequency coefficients may provide improved coding efficiency. The selection of specific quantization parameter values may be made using rate control, as described above. Additionally or alternatively, the quantizer may be designed to produce larger or more frequent low activity zones, for example by increasing a dead-zone for the high-frequency coefficients.

Figure 26:
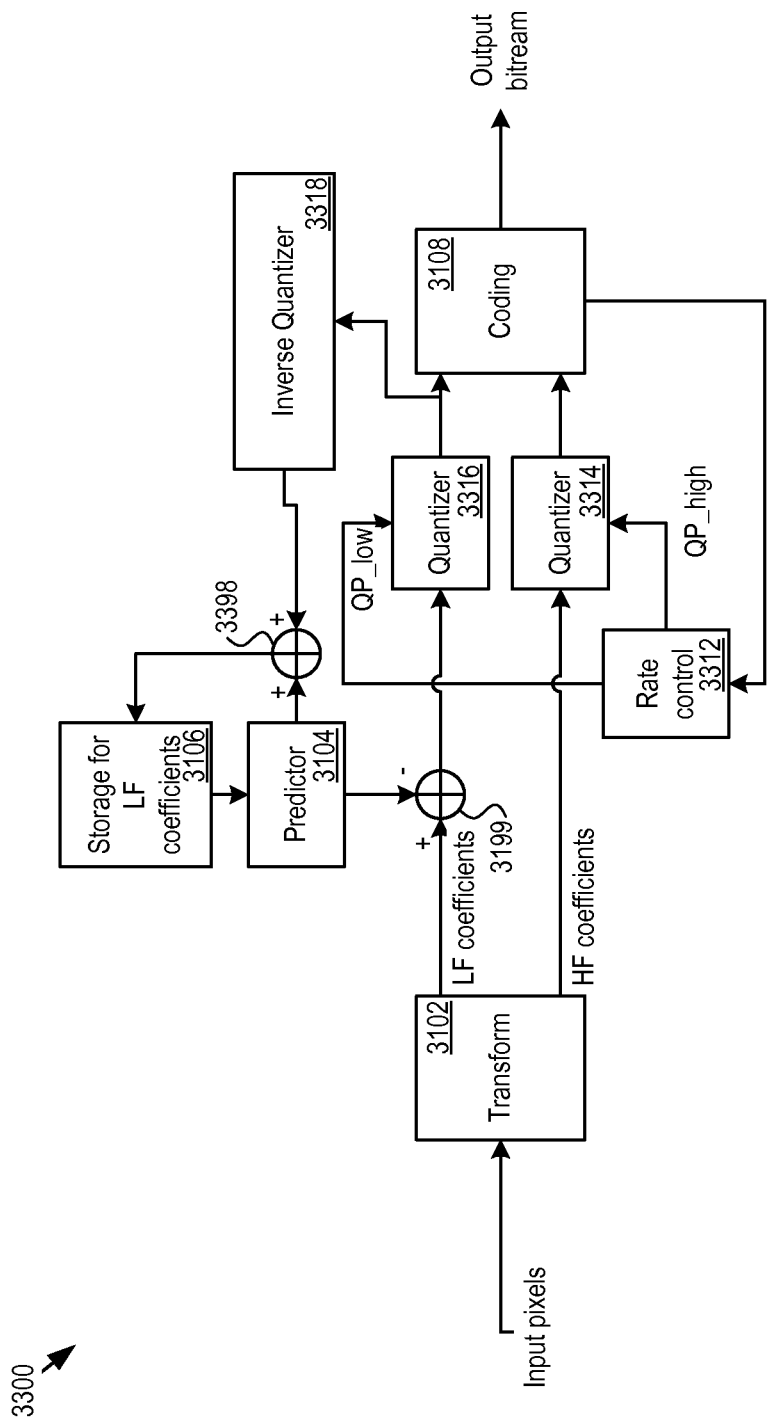
FIG. 26 shows an example encoder.

FIG. 26 shows an example encoder 3300. The example encoder 3300 may implement rate control for the encoder 3100 using rate control circuitry 3312, quantizers 3314, 3316, and inverse quantizer 3318. The rate control circuitry 3312 may determine QP values for the HF and LF components: QP_high and QP_low, respectively. The quantizers 3314, 3316 may use the QP values to perform quantization on the HF coefficients and LF residuals using quantization techniques discussed above. The use of two quantizers may allow for two different QP values to be implemented for the HF and LF values. The quantized output may then be provided to the coding circuitry 3108 for coding. The inverse quantizer 3318 accepts the quantized LF residuals as an input. The inverse quantizer 3318 may then de-quantize the LF residuals. The de-quantized output may be added to the predictor output at summer 3398 and stored at the storage element 3106 and used to determine predictors at the predictor circuitry 3104.

Figure 27:
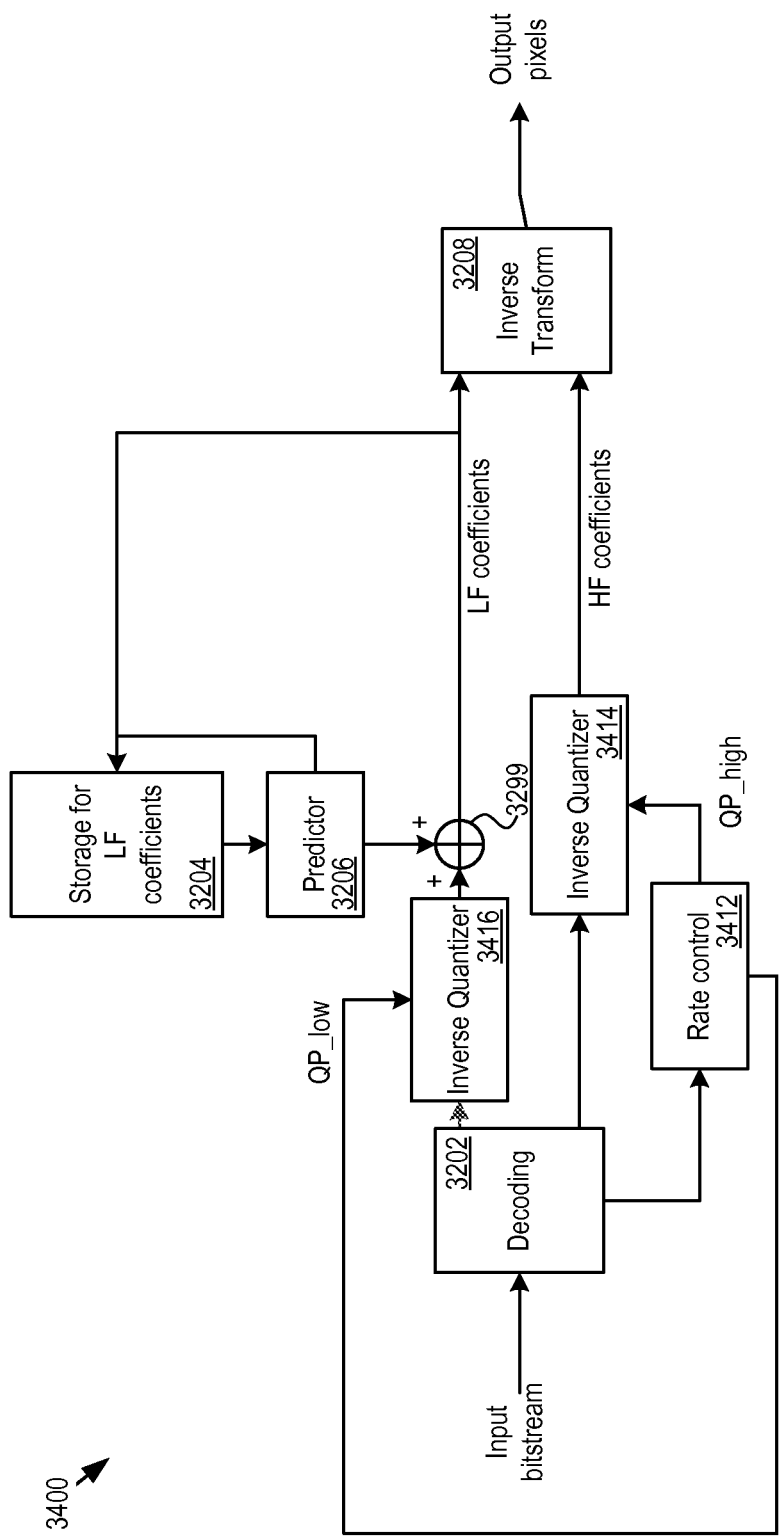
FIG. 27 shows an example decoder.

FIG. 27 shows an example decoder 3400. The example decoder 3400 may implement rate control, using the various ones of the techniques and architectures described above, for the decoder 3200 using rate control circuitry 3412 and inverse quantizers 3414, 3416. The rate control circuitry 3412 may determine QP values QP_high and QP_low. The inverse quantizers 3414, 3416 may use the QP values to perform inverse quantization of the HF and LF values using the techniques discussed above. The resulting de-quantized values may then be provided to the storage element 3204, predictor circuitry 3206, and inverse transform circuitry 3208 for implementation of the predictors and reconstruction of the decoded output pixels as discussed above with respect to example decoder 3200.

In some implementations, by mode switching, different types of coding may be used for different regions of an image. Text, particularly text that is rendered to improve resolution by exploiting the subpixel arrangement of the display, and other types of computer-generated content may be especially susceptible to displaying artifacts when a lossy scheme is used for encoding. Point-based coding schemes, such as ICH mode coding, may provide improved subjective quality with these types of content.

In one embodiment, transform coding and DPCM coding may be selected dynamically for different blocks or groups of pixels. For example, dynamic selection may be based on an estimated number of bits for transform coding versus that for DPCM coding. Additionally or alternatively, the dynamic selection may be based on the coding errors of the modes.

In some implementations, a coding system may dynamically select between hybrid mode, which may include a point coding of transform coefficients, and a different coding mode, for example an ICH mode or DPCM/ICH mode. For example, a selection between a point coding mode, such as a DPCM/ICH mode, and a hybrid mode may be applied to a set of pixels, such as a supergroup, macroblock, block, group or other set of pixels. In an example, a supergroup may include 6 consecutive pixels. In an embodiment, the selection of hybrid vs. point coding modes may be signaled using a code or entropy code in the bitstream. The code may be a bit flag, such as a single or multiple bit flag, which indicates the mode for a supergroup. The code may be a value of another code. The entropy code may be an escape code that signals a mode or switch in modes. The entropy code may include a flag that indicates whether or not point coding mode is used beginning in the next few supergroups followed by an optional field that indicates the specific supergroup where the mode switch applies. Alternatively a code may indicate which supergroups use which coding mode.

An encoder may dynamically determine which mode is used for a supergroup. The decision process may take into account one or more factors, including characteristics of the source pixels, the transform coefficients, the presence or absence of ICH hits, the number of bits or estimated number of bits required to code the supergroup in the point coding mode, the number of bits or estimated number of bits required to code the supergroup using each mode, the component-wise differences between a pixel in the supergroup and any of its neighbors (or other pixels in the supergroup or their neighbors), an estimation of the degree of visual distortion that would be introduced by each available choice of coding mode, and/or other factors. For example, it may be advantageous to favor a DPCM/ICH mode if ICH hits are likely, if pixels in and around the supergroup are close in value, if fewer bits are required for a DPCM/ICH mode, and/or if other favorable factors for a DPCM/ICH mode are present in the data stream.

In some implementations, transition handling between transform coding and point coding may be used. For example, at a transition from point coding to transform coding, the point coded reconstructed pixels may be fully or partially transformed. In an example, it may be advantageous to access the LF coefficients and not devote resources to determining HF coefficients. In the example, a partial transform may be used.

In another example, at the start of a segment of transform coding, samples within the segment near the transition boundary may be mirrored to represent virtual samples located before the transition, so that the transform may operate normally. Similarly, at a transition from transform coding to point coding, samples near the transition may be mirrored to represent virtual samples located after the transition. The number of samples that are mirrored to represent samples outside of the transform mode segment may depend on the specification of the transform. For example, if the transform is (5,3) DWT, 2 input samples may need to be mirrored at each of the transitions to provide the input samples to the DWT.

In another example, the transform may be an 8×2 transform similar to a DCT. If transitions to and from transform coding occur on boundaries that coincide with the boundaries of transforms, then mirroring of input samples need not be performed.

In some implementations, a selection between modes may be indicated in the bit stream a few pixels in advance of where the selection takes effect in order to facilitate low cost and/or simplified decoder implementations. Indicating a selection in advance of when it takes effect may enable a transform function, such as a wavelet transform, to determine where to terminate the filtering or start the filtering before the start or end of transform operations takes place. Advance signaling may facilitate timely handling of starting and termination conditions for transform functions.

Coding LF transform coefficients using predictors may advantageously use LF coefficient information for neighboring pixels or blocks being coded in a non-transform or point coding mode, for example a DPCM/ICH mode. Such neighboring LF information may be utilized by MAP predictors that are used to code LF transform coefficients. For example, a portion of a current line of pixels may be coded using a hybrid mode, and a neighboring portion of a previous line of pixels may be coding using a pixel mode. In an example, the reconstructed pixels that are coded using point coding are transformed before being written to the line storage for the low-frequency coefficients. The LF samples resulting from transforming the point coded samples may be used as inputs to a predictor that predicts the values of LF samples used for coding using a transform of hybrid mode. In another example, reconstructed point coded samples are written to a line storage and then transformed to produce values used by a predictor to predict sample values used for transform coding. In this example, the reconstructed point coded values in the line storage may be used for point coding of other samples, for example as inputs to a predictor used for point coding.

Figure 28:
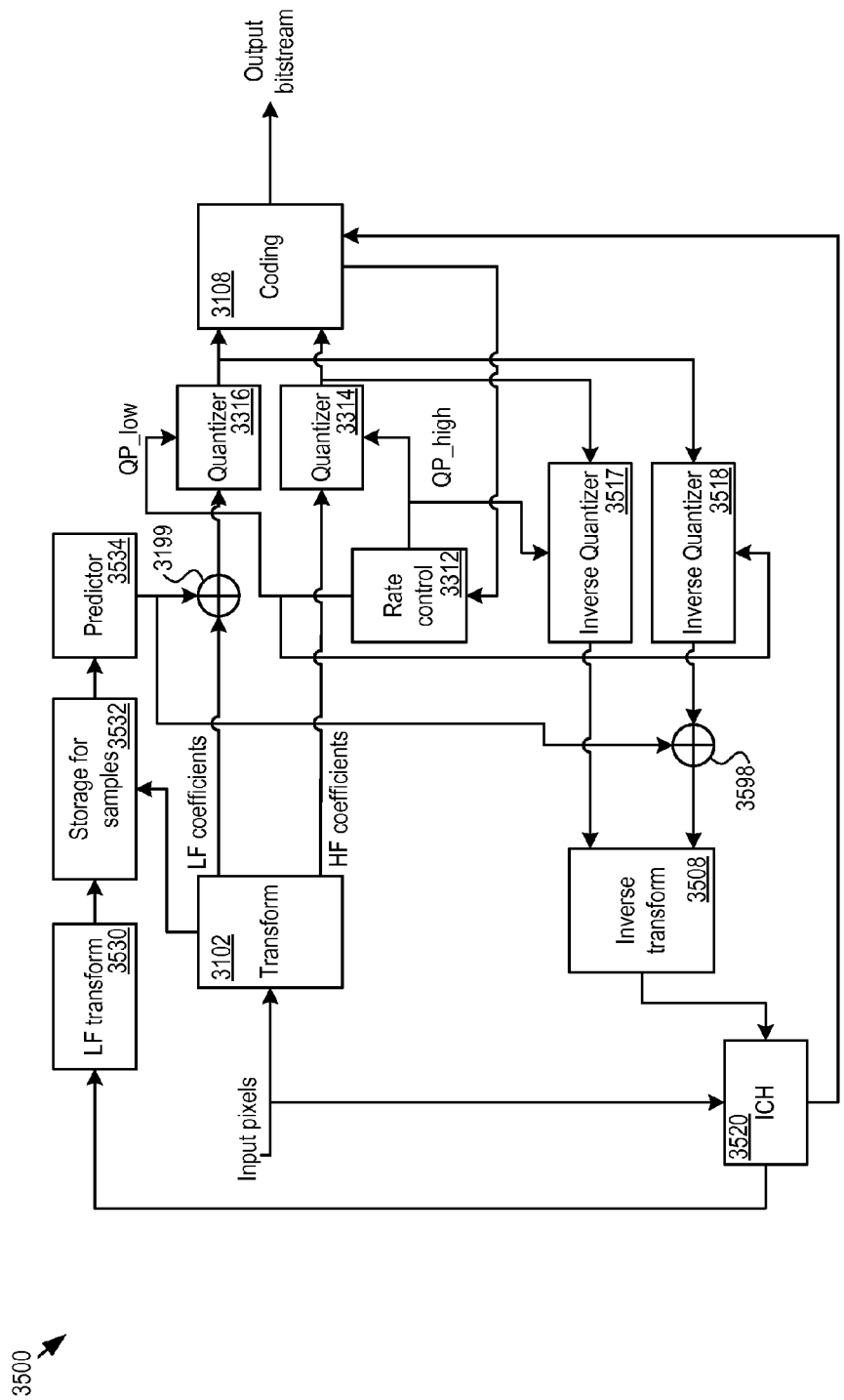
FIG. 28 shows an example encoder.

FIG. 28 shows an example encoder 3500. The example encoder 3500 may implement dynamic mode switching between a hybrid mode and an ICH mode. The example encoder 3500 may perform rate controlled transform coding of input pixels "using transform circuitry 3102 to generate LF and HF coefficients, rate control circuitry 3312, quantizers 3314, 3316, and coding circuitry 3108. Predictor circuitry 3534 may be used to generate predictors for coding LF coefficients. The predictors may be based on ICH coded pixel values, which are provided by ICH circuitry 3520. The ICH-coded pixel values may be transformed by the LF transform circuitry 3530 to form LF coefficients associated with the ICH coded pixel values which are then stored in storage element 3532, which may be a storage element such as a cache, buffer, or other storage element, for later use by the predictor circuitry 3534. Inverse quantizers 3517 and 3518 may de-quantize the output of quantizers 3314 and 3316, respectively. The reconstructed HF and LF coefficients may be provided to the inverse transform circuitry 3508 to reconstruct the decoded pixel output as an input to the ICH circuitry 3520. Prior to being inversely transformed, the predictor values may be added to the de-quantized LF residuals at summer 3598. The inverse transformed reconstructed values may be used to form ICH entries that may be entered into the ICH. When ICH mode encoding is not selected, LF values from the transform block 3102 may be used as predictors. LF coefficients may be coded using the ICH. When LF coefficients are coded using the ICH, those values may serve as inputs to a predictor similar to predictor 3534 for predicting values of other LF coefficients. As part of a hybrid coding operation, LF coefficients may be coded using either prediction or ICH, and the method of coding may be selected dynamically. Predictors for hybrid mode data may be based on other hybrid mode data and/or data coded in an ICH mode. For example, for a hybrid mode supergroup with a neighboring ICH mode coded group, the hybrid mode supergroup may base its predictors on the neighboring ICH mode coded group. The ICH circuitry 3520 may also provide ICH mode output for coding when ICH mode coding is selected. The entries formed from hybrid mode coded areas may be used as inputs for coding ICH mode areas. For example, for an ICH group neighboring a hybrid mode coded area, the process of coding the ICH group may code pixels as values in the ICH. The ICH may contain values derived from reconstructed pixels coded using a non-ICH method, for example hybrid mode coding.

Figure 29:
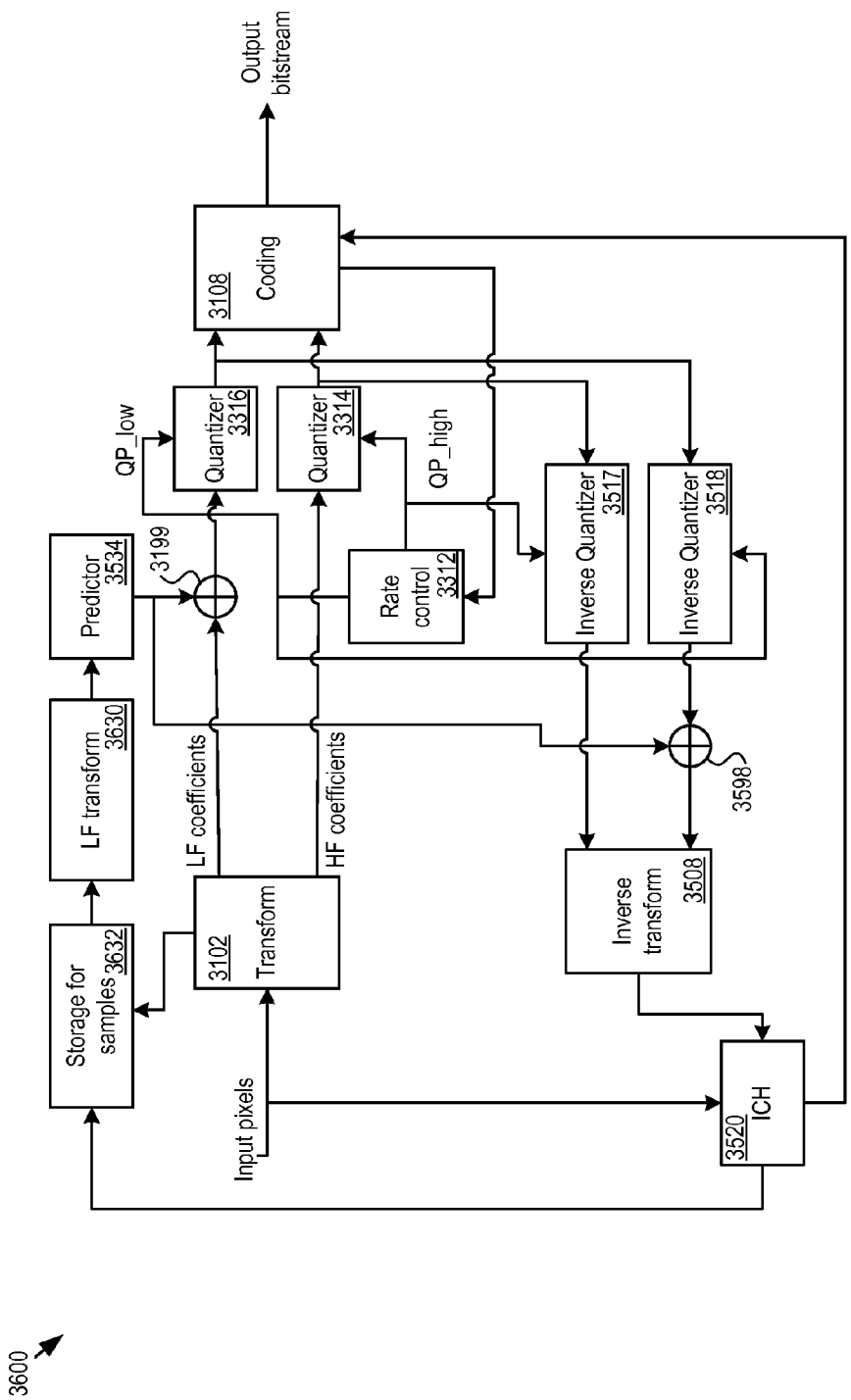
FIG. 29 shows an example encoder.

In another example, the reconstructed pixels that are coded using a point-coding mode are written directly to the line storage that is used by the predictor, and they are transformed before they are used in the prediction of transform coded pixels. The point coding mode may utilize for example DPCM, ICH, other point coding methods or any combination of these, and may include dynamic selection between two or more point coding methods such as DPCM and ICH. FIG. 29 shows an example encoder 3600. In the example encoder 3600, entries from the ICH 3520 are stored at storage element 3632 before being passed to the LF transform circuitry 3630.

In another example, to predict a first LF transformed value immediately following a transition from a point coding mode to a hybrid mode the reconstructed sample to the left of that first LF sample may be used as the sample in the "A" position (see FIG. 5) in a MAP for predicting the first LF transform coefficient value. Additionally or alternatively, a low-pass filtered version of the reconstructed samples to the left may be implemented as the sample in the "A" position for MAP prediction of the first LF transformed value. Such techniques may be advantageous for circuit timing in a hardware implementation.

A MAP predictor used with a DPCM/ICH mode may use as inputs reconstructed samples at positions neighboring the pixel or sample to be encoded. In some implementations, reconstructed neighboring pixel values coded using a mode that differs from the mode used to code a current pixel may not be available at the time they should be processed by the MAP predictor. If the reconstructed pixels immediately to the left are not available, other recently reconstructed pixels may be used instead. For example, the most recently reconstructed pixel that is available may be used. Additionally or alternatively, the reconstructed pixel may be estimated through a linear combination of available pixels.

Some implementations may include ICH mode coding within a hybrid mode. For example, ICH mode processing may be performed on LF coefficients rather than on original pixels. An ICH may then hold LF coefficient values rather than reconstructed pixel values. For example, LF coefficients coded using ICH may be treated as an input to a DPCM scheme which is used for coding LF coefficients and the HF coefficients may be coded in separate entropy coding units.

In some implementations, either all or a subset of hybrid coded pixel values are entered into an ICH cache which may be used for coding in an ICH mode. The values of reconstructed pixels associated with LF transform coefficients, such as, those at even pixel positions, may form the subset of hybrid coded pixel values that are entered into the cache. Values entered into the cache may be used for ICH coding as described above.

The DSU-VLC entropy coding method described above may be used in conjunction with transform coding or alternatively with hybrid mode coding, where hybrid coding may comprise transform or wavelet coding. For hybrid mode encoding or decoding, for example, the LF residuals and HF coefficients may be coded in independent units with independent size predictions. For encoding or decoding where dynamic selection between a point coding mode and hybrid mode is implemented, the size predictions for hybrid mode may be separate from the size predictions for the point coding mode. For example, the size predictions used in DSU_VLC for a point coding mode may be based on the sizes of the samples coded using the point coding size predictions for a hybrid mode may be based on the sizes of the coefficients or residuals coded using the hybrid mode. In one embodiment, a size prediction for a unit of samples coded using a first mode immediately following a transition from a second mode to the first mode may be based on values coded using the first mode before a preceding transition from the first mode to the second mode. In another example, the size predictions for point coding mode and the LF components of the hybrid mode are shared. Such shared size predictions may be used across points where mode switching occurs. For example, a size prediction made in one mode may be used to predict a size in a different mode.

In an example system where dynamic selection between a hybrid mode and an ICH mode is implemented, an escape code can be used to signal the use of the ICH mode.

In various implementations, entropy coding may be used to reduce the number of zero-valued coefficients transmitted in the output of the encoder. For example, in some regions many of the HF coefficients may be zero valued. Alternatively, quantization of the HF components may result in zero values. These zero values may be omitted from the coded output. The zero values may be indicated implicitly rather than be expressly included in the coded output. In some implementations, at some QP or buffer levels, the encoder may determine that is inefficient to code HF coefficients because of a high number of zero valued coefficients. In some implementations, the encoder may cease encoding the HF coefficients until the QP or buffer level returns to a state where it is efficient to code the HF coefficients. In some implementations, the absence of the HF coefficients may implicitly indicate to the decoder that the HF coding has ceased. In other implementations, the data stream may include an explicit code signaling the absence or presence of the HF coefficients.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (for example, subroutines) of a single program, separate programs, distributed across several memories and processors, or implemented in many different ways, such as in a library, such as a shared library (for example, a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. An encoding method, comprising:
receiving an input stream comprising a first sample;
determining a non-transform coding size estimate, the non-transform coding size estimate indicating an estimated number of bits to encode the first sample without decomposing the first sample using a transform;
determining a transform coding size estimate, the transform coding size estimate indicating an estimated number of bits to encode the first sample while decomposing the first sample using the transform; and
when the transform coding size estimate is larger than the non-transform coding size estimate, encoding the first sample without decomposing the first sample using the transform, otherwise:
decomposing the first sample via the transform to produce a first coefficient for a first frequency component and a second coefficient for a second frequency component;
encoding the first coefficient using a first coding scheme, the first coding scheme using a predictor based on a third coefficient from the first frequency component; and
encoding the second coefficient using a second coding scheme different from the first coding scheme.

2. The method of claim 1, wherein encoding the first coefficient using the predictor comprises applying a median adaptive predictor.

3. The method of claim 1, wherein the third coefficient comprises a vertically displaced coefficient, a horizontally displaced coefficient, or a vertically and horizontally displaced coefficient.

4. The method of claim 1, further comprising applying rate control to the encoding of the first coefficient and the encoding of the second coefficient.

5. The method of claim 4, wherein:
a first quantization level is applied for the encoding of the first coefficient; and
a second quantization level is applied for the encoding of the second coefficient, the second quantization level being different from the first quantization level.

6. The method of claim 1, wherein the second coding scheme comprises a coding scheme that does not rely on correlation.

7. The method of claim 1, wherein the transform comprises a wavelet transform.

8. The method of claim 1, wherein the first frequency component comprises a lower frequency band than the second frequency component.

9. The method of claim 8, wherein the first coefficient corresponds to a lowest frequency component.

10. The method of claim 8, wherein the second coefficient corresponds to a highest frequency component.

11. The method of claim 1, wherein decomposing the first sample comprises decomposing the input stream using a multi-dimensional wavelet transformation.

12. The method of claim 1, wherein:
the input stream further comprises a second sample; and
the method further comprises:
determining an additional non-transform coding size estimate for encoding the second sample without decomposing the second sample using the transform; and
determining an additional transform coding size estimate for encoding while decomposing the second sample using the transform.

13. The method of claim 12, further comprising:
responsive to the non-transform coding size estimates and the transform coding size estimates:
encoding the second sample without decomposing the second sample using the transform by applying a point coding mode to the second sample; and
encoding the first sample while decomposing the first sample using the transform.

14. The method of claim 13, wherein the point coding mode comprises an index color history coding mode.

15. The method of claim 12, wherein:
the input stream comprises an image; and
the first and second samples comprise groups of pixels.

16. A device, comprising:
an input interface configured to receive an input stream comprising a sample; and control circuitry configured to:
determine a non-transform coding size estimate, the non-transform coding size estimate indicating an estimated number of bits to encode the sample without decomposing the sample using a transform;
determine a transform coding size estimate for coding while decomposing the sample using the transform;
when the transform coding size estimate is smaller than the non-transform coding size estimate:
apply the transform to the sample to generate a first coefficient of a first frequency component and a second coefficient of a second frequency component;
determining a predictor for the first coefficient for the first frequency component, the predictor being based on a third coefficient from the first frequency component;
code the first coefficient using a first coding scheme, the first coding scheme using the predictor; and
code the second coefficient using a second coding scheme different from the first; and
when the transform coding size estimate is larger than the non-transform coding size estimate, code the sample without decomposing the sample using the transform.

17. The device of claim 16, wherein the control circuitry is further configured to code the first coefficient using differential pulse code modulation based coding.

18. The device of claim 16, wherein the control circuitry is further configured to omit, from an encoded output stream, a fourth coefficient for the second frequency component to indicate a zero value for the fourth coefficient.

19. An encoding method, comprising:
receiving an input stream comprising a sample;
determining a non-transform coding size estimate, the non-transform coding size estimate indicating an estimated number of bits to encode the sample without decomposing the sample using a wavelet transform;
determining a transform coding size estimate for encoding while decomposing the sample using the wavelet transform;
when the transform coding size estimate is smaller than the non-transform coding size estimate:

applying the wavelet transformation to decompose the input stream into a high frequency component and a low frequency component; and at encoding circuitry:
selecting a first quantization level for rate-controlled encoding of a first coefficient for the low frequency component;

determining a prediction for the first coefficient;

selecting a second quantization level for encoding a second coefficient for the high frequency component;

coding, via differential pulse code modulation, the first coefficient using the first quantization level and the prediction; and coding the second coefficient using the second quantization level; and when the transform coding size estimate is larger than the non-transform coding size estimate, encoding, at the encoding circuitry, the sample without decomposing the sample using the transform.

20. The method of claim 19, wherein the wavelet transformation comprises a multi-dimensional wavelet transformation.

\* \* \* \* \*